(12) United States Patent
Bosteels

(10) Patent No.: US 10,562,010 B2
(45) Date of Patent: Feb. 18, 2020

(54) STRATIFIED CHARGE COMBUSTION ENGINE

(71) Applicant: MC EARTH HOLDINGS LTD, County Cork (IE)

(72) Inventor: Dominique Bosteels, County Cork (IE)

(73) Assignee: MC EARTH HOLDINGS LTD, County Cork (IE)

( * ) Notice: Subject to any disclaimer, the term of this patent is extended or adjusted under 35 U.S.C. 154(b) by 119 days.

(21) Appl. No.: 15/983,969

(22) Filed: May 18, 2018

(65) Prior Publication Data
US 2018/0264441 A1    Sep. 20, 2018

Related U.S. Application Data

(63) Continuation-in-part of application No. PCT/IB2015/002196, filed on Nov. 20, 2015, and a
(Continued)

(51) Int. Cl.
    *B01J 23/10*    (2006.01)
    *B01J 35/00*    (2006.01)
    (Continued)

(52) U.S. Cl.
    CPC .............. *B01J 23/10* (2013.01); *B01D 53/94* (2013.01); *B01J 21/066* (2013.01); *B01J 21/18* (2013.01); *B01J 35/0006* (2013.01); *B01J 35/023* (2013.01); *B01J 37/0225* (2013.01); *F01B 3/02* (2013.01); *F01B 7/02* (2013.01);
    (Continued)

(58) Field of Classification Search
    CPC ... B01J 23/10; B01J 23/18; B01J 21/18; B01J 35/0006; B01J 37/0225; F02M 27/02; F02B 17/00; F02B 51/02; B01D 53/94
    See application file for complete search history.

(56) References Cited

U.S. PATENT DOCUMENTS 1,564,906 A   12/1925 Sokal
3,923,011 A   12/1975 Pfefferle
(Continued)

FOREIGN PATENT DOCUMENTS

EP   1590555       2/2005
EP   2119491 A1   11/2009
(Continued)

OTHER PUBLICATIONS

International Search Report and Written Opinion in corresponding PCT/IB2017/000806, dated Aug. 11, 2017.
(Continued)

*Primary Examiner* — Jacob M Amick
(74) *Attorney, Agent, or Firm* — Hovey Williams LLP

(57) ABSTRACT

The invention relates to an at least partly stratified (such as at least partly dual stratified) charge combustion engine, especially CAI (combustion assisted ignition), HCC, HCSI and HCCI engine, in which the combustion of a hydrocarbon containing fuel generating a flame emitting photon is operated in a chamber with a wall provided with a cerium oxide-carbon containing coating, said coating further comprising at least comprising oxides of the followings elements Pr, Nd, La and at least Y and/or Zr. The engine of the invention enables a catalytic reduction of NOx exhaust rate.

36 Claims, 5 Drawing Sheets

Related U.S. Application Data continuation-in-part of application No. PCT/IB2017/000806, filed on Jul. 3, 2017, which is a continuation of application No. PCT/IB2016/000948, filed on Jul. 4, 2016, application No. 15/983,969, which is a continuation-in-part of application No. PCT/IB2017/000809, filed on Jul. 3, 2017, which is a continuation of application No. PCT/IB2016/000951, filed on Jul. 4, 2016.

(51) Int. Cl.
    *B01J 21/18*     (2006.01)
    *F02M 27/02*     (2006.01)
    *F02B 17/00*     (2006.01)
    *F02B 51/02*     (2006.01)
    *B01J 37/02*     (2006.01)
    *F01B 7/02*     (2006.01)
    *F02B 75/26*     (2006.01)
    *B01J 21/06*     (2006.01)
    *F01B 3/02*     (2006.01)
    *B01J 35/02*     (2006.01)
    *B01D 53/94*     (2006.01)
    *B01D 53/83*     (2006.01)

(52) U.S. Cl.
    CPC .............. *F02B 17/00* (2013.01); *F02B 51/02* (2013.01); *F02B 75/26* (2013.01); *F02M 27/02* (2013.01); *B01D 53/83* (2013.01); *B01D 2251/404* (2013.01); *B01D 2251/604* (2013.01); *Y02T 10/128* (2013.01)

(56) References Cited

U.S. PATENT DOCUMENTS

| | | | |
|---|---|---|---|
| 4,011,839 | A | 3/1977 | Pfefferle |
| 4,577,611 | A | 3/1986 | Hagino |
| 5,899,679 | A | 5/1999 | Euzen et al. |
| 7,188,470 | B2 | 3/2007 | Bosteels |
| 7,482,303 | B2 | 1/2009 | Bosteels |
| 7,723,257 | B2 | 5/2010 | Bosteels |
| 2003/0186181 | A1 | 10/2003 | Kang et al. |
| 2005/0019578 | A1* | 1/2005 | Bosteels ............ B01D 53/9431 428/408 |
| 2005/0163691 | A1 | 7/2005 | Kelkar et al. |
| 2007/0006595 | A1 | 1/2007 | Bruck et al. |
| 2007/0220873 | A1 | 9/2007 | Bosteels |
| 2012/0180464 | A1 | 7/2012 | Wei et al. |
| 2014/0274675 | A1 | 9/2014 | Nazarpoor |

FOREIGN PATENT DOCUMENTS

| | | |
|---|---|---|
| WO | 2008088027 A1 | 7/2008 |
| WO | 2015061482 | 4/2015 |

OTHER PUBLICATIONS

International Search Report and Written Opinion in corresponding PCT/IB2017/000809, dated Oct. 16, 2017.

International Search Report and Written Opinion in corresponding PCT/IB2015/002196, dated Oct. 8, 2016.

\* cited by examiner

STRATIFIED CHARGE COMBUSTION ENGINE

CROSS-REFERENCE TO RELATED APPLICATIONS

The present application is a continuation-in-part application of International Patent Application No. PCT/IB2015/002196 filed Nov. 20, 2015; and of International Patent Application No. PCT/IB2017/000806 filed Jul. 3, 2017, which claims the priority of International Patent Application No. PCT/IB2016/000948 filed Jul. 4, 2016; and of International Patent Application No. PCT/IB2017/000809 filed Jul. 3, 2017, which claims the priority of PCT/IB2016/000951 filed on Jul. 4, 2016, each of which is incorporated by reference herein in its entirety.

BACKGROUND OF THE INVENTION

Field of the Invention

The invention relates to an at least partly stratified (such as at least partly dual stratified) charge combustion engine, especially CAI (combustion assisted ignition), HCC, HCSI and HCCI engine, in which the combustion of a hydrocarbon containing fuel generating a flame emitting photon is operated in a chamber with a wall provided with a cerium oxide-carbon containing coating, said coating further comprising at least comprising oxides of the followings elements Pr, Nd, La and at least Y and/or Zr. The engine of the invention enables a catalytic reduction of NOx exhaust rate. The invention relates also to a catalyst, precursor, regenerative support and various uses thereof.

Description of Related Art

Combustion of fuel can be operated a cold combustion or a hot combustion, by reacting a fuel with oxygen or oxygen containing medium, said reaction comprising oxidation reaction as well as reduction reaction.

Fuel efficiency is nowadays more problematic, due to pollution and health problems generated by said pollution.

Fuel efficiency for engines (such as internal combustion engines, external combustion engines, with or without turbo, EGR, etc., possibly as hybrid engines), especially for on road vehicles (like cars and trucks, as well as bikes), ships, trains, flying apparatuses (like aeroplanes), which were considered by mechanical engineers as substantially complete, is more and more questioned, as assumed efficiency figures are not corresponding to the current figures achieved by the end user, for example for cars and trucks, with moreover higher than foreseen CO and NOx exhaust rates, as well as higher CO2 exhaust rates.

The proposed system for improving efficiency comprises for example system enabling direct injection, most particularly controlled continuous or intermittent direct injection, instead of fuel admission through the air intake manifold or through a port fuel tube.

As disclosed in U.S. Pat. No. 8,347,613, direct injection (DI) engines may produce more soot than port fuel injected engines in part due to diffuse flame propagation. As a consequence of diffuse flame propagation, fuel may not adequately mix with air prior to combustion, resulting in pockets of rich combustion that generate soot. Further, DI engines may be susceptible to generating soot during high load and/or high-speed conditions when there is a lack of sufficient air and fuel mixing.

For solving this particle problem, it has been proposed to apply particulate filters to DI, spark-ignition engines or compression ignition engines, leading then the problem of regular filter regeneration steps, during which accurate emission control is difficult to maintain during particulate filter regeneration in a DI, spark-ignition engine. Such filter reduces however the engine efficiency, as generating a pressure drop in the exhaust filter. Due to the high volume of small particles and soot, filter is quickly at least partly clogged. Soot will also generate other problems with respect to gas recycling systems (EGR), that will clog too.

The U.S. Pat. No. 8,347,613 suggests for solving said problem particle clogging of the filter to generate compressed air and to push said compressed air through the particulate filter, meaning thus that small particles are released back into the atmosphere.

Homogeneous charge combustion has also been proposed for increasing the fuel efficiency. More and more researches have therefor been directed to systems for ensuring CAI, HCC, especially HCCI and HCSI.

For example, U.S. Pat. No. 7,290,522 (Prof Heywood et al) relates to homogeneous charge compression ignition (HCCI) engine. As stated by Professor Heywood of the MIT, the use of HCCI combustion ensures high engine efficiency with extremely low NOx, CO and particulate emissions.

Professor Heywood teaches the use of hydrogen and hydrogen mixed with CO in order to enhance knock resistance, and thus resistance to auto ignition, i.e. auto ignition generated at higher temperature and pressure.

It means thus well that for expert in the chemistry of the fuel combustion in engine, the efficiency of the combustion can still be improved, with moreover reduced NOx, CO and particles emissions.

The admission of Hydrogen possibly mixed with CO in a combustion chamber is not easy and lead to several technical problems, such as the storage of hydrogen.

US 2005/163,691 (Engelhard Corporation) discloses a composition for controlling NOx emission during catalyst regeneration step in a fluid catalytic cracking process. The composition comprises microsphere of mixed oxide of cerium and zirconium, optionally an oxide of the lanthanide series other than cerium and zirconium, and optionally at least one oxide of the transition metal of group Ib and IIb. When analysing Table 1 of said document, it appears that the composition for keeping the Surface Area following a steam treatment is a zirconium rich composition (more than 50% Zirconia).

US 2014/274,675 (CDTI) relates to compositions for the preparation of ZPGM oxidation catalyst (i.e. zero platinum group metal oxidation catalyst). The catalyst comprises a substrate, covered by a washcoat, covered by an overcoat. For reducing the temperature for 50% NO conversion, the composition has to comprise an Ag—Cu—Ce containing overcoat.

US2015/202,596 (Rhodia Operations) discloses a composition comprising a high proportion of zirconia (from about 60% up to about 85%—see Table 2), the remaining part being cerium oxide (up to 15%), lanthanide oxide, Yttrium oxide, praseodymium oxide or neodymium oxide.

US2018/021759 (Girem), which is the US national phase of PCT/CN2016/072202 claiming the benefit of the priority of CN2015/10067084.5 filed on Feb. 9, 2015, relates to a cerium-zirconium composite oxide comprising up to 20% of a metal oxide selected from rare earth other than cerium, transition metal element and alkaline earth metal. The disclosed compositions in the examples have always a low lanthanide oxide content and are zirconium oxide rich or cerium oxide rich composition. There is no mention in said document to a balance requirement between cerium oxide/zirconium oxide/lanthanide oxide.

U.S. Pat. No. 9,140,167 (Johnson Matthey) discloses a lean burn internal combustion engine with an exhaust system comprising a first oxidation catalyst adapted for recovering catalytic oxidation activity following ageing of the engine exhaust treatment system.

In order to improve the efficiency of fuel combustion, it has been already proposed by the present inventor to operate the combustion of the fuel in presence of a heterogeneous catalyst comprising some cerium and carbon. For example, reference can be done to WO2006017915, U.S. Pat. Nos. 7,482,303, 7,188,470, EP1590555B1, and U.S. Pat. No. 7,723,257. However, all said documents does not disclose a composition as claimed.

Opposed piston engines existed in the past (such as for marine and submarines), for example sold under the trade name Fairbanks-Morse. However, more and more researches have now been done for further reducing consumption, as well as for other advantages, as explained in the article "Opposed-piston engines: the future of internal combustion engines?", Kalke Jakub et al., PhD Interdisciplinary Journal, pages 175-184, 2014 (sdpg.pg.gda.pl/pij/wp-content/blogs.dir/ . . . /01_2014_19-kalke.pdf—created on Dec. 8, 2014).

Other article of interest is available via the web mdpi.com/1996-1073/8/7/6365/pdf; "An experimental investigation on the combustion and heat release characteristics of an opposed-piston folded-cranktrain diesel engine", Fukang Ma et al, Energies 2015, 8 6365-6381

The invention is using a heterogeneous catalytic system comprising rare earth metals. Problems associated to heterogeneous catalytic system are among other limited catalytic life time, variable working efficiency in function of reaction conditions, etc.

The experience and further searches carried out by the inventor have shown that catalyst could be still be improved, for fuel efficiency purposes for a long period of time, as well as for variable working conditions. The new catalyst of the invention enables also an easier control of the working of the engine, while being submitted to variation of load or speed. The system of the invention is thus a dynamic bi functional or hybrid system combining rare earth metal oxides and non-rare earth metal oxides, together with carbon particles. The system of the invention uses a catalytic coating having a good thermal resistance, a good catalytic longevity, a good resistance to vibrations, pressure variations. It seems that some metal elements of the catalyst coating are sintered with the metal surface of the combustion chamber (for example of the aluminium alloy of the combustion chamber). It was observed that catalytic efficiency or working was achieved from low temperature (such as temperature of less than 300° C.) up to high temperature (such as temperature higher that 700° C., or even higher than 900° C.). It was observed that catalyst coatings of the invention were suitable to catalyse redox reactions on and in the porous catalytic coating. It was also observed that due to the catalyst coating of the invention, some flame quenching could be prevented, such as side wall quenching and/or tube quenching (cylinder quenching). It was also observed that ionisation current was better conserved adjacent to the catalyst coating. Without being bound to any theory, it is expected that the catalyst coating ensures within the free volume of the combustion chamber a thicker intermediate layer between the flame plasma and the catalyst coating of the invention, with respect to a combustion chamber not provided with the catalyst coating.

Without being bound to any theory, it is expected that the catalyst coating of the invention ensures a more controlled ionisation level, with reduced chemi ionisation peak and thermal ionisation peak, even in presence of large excess of air, such as with lambda value of more than 1.4, or even 1.5. It seems also that the temperature of the face of the wall of the combustion chamber is less subject to high variations, despite intake step and exhaust step in particular in a four-cycle engine.

The control of chemical catalysis is disclosed in U.S. Pat. No. 7,998,538 (California Institute of Technology). As stated in said documents, many catalytic reactions have a temperature threshold. Prior art methods utilise macroscopic heat source to provide heat for such reactions and typically entail gross convection, gross conduction, or gross radiation. Inherent with the use of such conventional methods of heating, is the difficulty of having control of the temperature of a catalyst, the vicinity of the catalyst and/or the heat applied, both temporally and spatially.

In a combustion chamber of current engine, reaction is substantially operated in the volume of the chamber, without heterogeneous catalyst. In the engine of the invention, wall of the combustion chamber is coated with a catalyst coating, the working of said catalyst coating being controlled by photon-electron interactions, said interactions having not only localised effect on the temperature of the coating, but also on the local charging of photon-electron of the coating for controlling local radical reaction on the catalyst coating.

When burning fuel, a large quantity of photon-electron energy is emitted. In the current engine, said photon-electrons are not used for catalytic efficiency purposes.

SUMMARY OF THE INVENTION

The invention relates to an at least partly stratified charge combustion engine, for example stratified combustion along one surface (like the head surface of the piston surface) or along several surfaces (like two opposite surfaces, such as the head surface and the piston surface), in which the combustion of a hydrocarbon containing fuel generating a flame emitting photon is operated in a chamber with a wall provided with a cerium oxide-carbon containing coating, said cerium oxide-carbon containing coating further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ or [H.] species on the cerium oxide-carbon containing coating of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The cerium oxide-carbon containing coating has advantageously a thickness of less than 100 μm, such as less than 70 μm, for example a thickness from 10 to 70 μm.

While not being bound to any theory, reduction of pollutant could be a combination of one or more of the following: no or reduced flame front generating end gas source of unburned hydrocarbon, lower deposit of unburned hydrocarbons, less or no outflow of hydrocarbons from wall crevices, no or less entrainment or flow of hydrocarbons from wall to the exhaust, no or lower scrapping of hydrocarbons from the walls, etc.

The invention relates also to an at least partly stratified charge combustion engine being an opposed-piston engine comprising at least one cylinder in each of which a first piston with a first cross section with a first diameter is moving along a first axis and a second piston with a second cross section with a second diameter equal or different from the first diameter is moving along a second axis parallel to the first axis, whereby said first piston and said second piston are reciprocating along to each other between a first position in which the said first and second pistons are close the one to the other in the cylinder considered, whereby defining in said cylinder considered a small volume between the said first and second pistons, and a second position in which the first and second pistons are away the one with respect to the other so as to define therebetween a second volume in the cylinder considered which is greater than the first volume, whereby each cylinder is provided with a catalytic open element located within the small volume of the cylinder considered, said open element separating the said first volume into a first zone directed towards the first piston and a second zone directed towards the second piston, while defining one or more open channels extending between the first zone and the second zone, said one or more passages defining an open cross section defining an open surface within a plane perpendicular to the first axis and second axis which is comprised between 0.2 and 0.8 times (advantageously 0.3 and 0.7, preferably between 0.4 and 0.6, such as from 0.5 to 0.6) the average cross section of the first and second piston, whereby at least the one or more channels of the catalytic element is provided with a cerium oxide-carbon containing coating, said coating further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ species on the wall and/or surfaces of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall and/or surfaces of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The invention relates also to a power engine comprising a combustion chamber in which a fuel is burn for generating gases for moving a driving element, especially an engine as disclosed here above with opposed pistons, whereby the combustion chamber comprises at least one element selected from the group consisting of a fuel injector, a water vapour injector, a spark plug, a sensor comprising at least a core provided with a cerium oxide-carbon containing coating, said coating of the element further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ species on the wall and/or surfaces of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall and/or surfaces of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

Advantageously, the cerium-carbon coating of the catalytic element or core is adapted for capturing photons emitted by the flame with wavelength from 6500 to 7500 Å, advantageously for capturing 5 to 25% of the photons with wavelength from 6500 to 7500 Å emitted by the flame having a temperature higher than 800° C.

Preferably, the cerium-carbon coating of the catalytic element or core is adapted for ensuring a photon amplified spectrum emission radiation at least at a temperature comprised between 500 and 800° C., said spectrum covering advantageously substantially the whole range from about 4000 Å up to 7500 Å.

Most preferably, the element has a plurality of distinct channels with a minimum open cross section of at least 0.5 $cm^2$, advantageously at least 1 $cm^2$.

According to a preferred embodiment, the element or core is made at least partly in a temperature ceramic like material, advantageously comprising aluminium.

The engine of the invention is advantageously an engine, which comprises a plurality of cylinders and a central axis provided with two wobble plates, a first series of pistons being turned to a first wobble plate and connected to said first wobble plate by means of a first series of rods, while a second series of pistons are turned to the second wobble plate and are connected to said second wobble plate by means of a second series of rods.

According to an embodiment, the engine is an invention, which cycles comprise each at least four successive steps, namely an intake step for charging the combustion chamber with at least oxygen and nitrogen, a compression step in which said at least oxygen and nitrogen is compressed, a combustion step in the combustion chamber, and an exhaust step for the exhaust of gases present in the combustion chamber, whereby at least during one step selected from the group of the intake step and compression step, the cerium oxide-carbon coating of the element comprising oxides of the followings elements Pr, Nd, La and at least Y and/or Zr, is adapted for uptake of oxygen atoms at temperature comprised between 100 and 400° C.

Advantageously, each cylinder is associated to at least one injector for the admission of a combustible material within the cylinder, adjacent to the catalytic element or at the level of the catalytic element, and/or to at least one injector for the admission of water vapour within the cylinder, adjacent to the catalytic element or at the level of the catalytic element.

The inner wall and/or surfaces of the cylinder or combustion chamber is/are advantageously provided with a cerium oxide-carbon containing coating, said cerium oxide-carbon containing coating further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ or [H.] species on the cerium oxide-carbon containing coating of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall and/or surfaces of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The cerium oxide-carbon containing coating of said inner wall and/or surfaces and/or of the catalytic element and/or core has advantageously a thickness of less than 100 μm, such as less than 70 μm, for example a thickness from 10 to 70 μm.

Carbon containing coating in the present invention or embodiments thereof means a coating comprising graphite carbon, most preferably like as 2dimensional-graphene and/or graphane structures (such as structures with a larger Raman intensity peak between 2600-2700 Raman shift (1/cm) than the Raman peak intensity between 1500-1700 Raman shift (1/cm). The carbon containing coating of the invention is preferably a coating for which at least 30% by weight of the carbon is in a form of 2dimensional-graphene and/or graphane structure, advantageously mixed with graphite having the structure of nanotubes (such as single wall carbon nano tubes, double wall carbon nano tubes or multi wall carbon nano tubes) and/or fullerene and/or combinations thereof.

The catalytic coating disclosed for the combustion chamber of the engine of the invention can also be used for other purposes, such as for the post treatment of exhaust gases, especially exhaust gases containing fuel and/or carbon containing particles. The catalyst coating is then advantageously supported on an aluminium containing support, an alumino silicate support and/or alumino phospho-silicate support, like a cordierite-like support.

Advantageously, the cerium-carbon coating is adapted for capturing photons emitted by the flame with wavelength from 6500 to 7500 Å, advantageously for capturing 5 to 25% of the photons with wavelength from 6500 to 7500 Å emitted by the flame having a temperature higher than 800° C.

According to an advantageous embodiment, the cerium-carbon coating is adapted for ensuring a photon amplified spectrum emission radiation at least at a temperature comprised between 500 and 800° C., said spectrum covering advantageously substantially the whole range from about 4000 Å up to 7500 Å (i.e. ensuring thus emission of rays in the violet range (wave length from 4000 Å up to about 4500 Å), in the blue range (wave length from 4500 Å up to 5200 Å), in the green range (from about 5200 Å up to about 5700 Å), in the yellow range (from about 5700 Å up to about 5900 Å), in the orange range (from about 5900 Å up to 6250 Å) and in the red range (from about 6250 Å up to about 7500 Å). The emission is advantageously controlled so that emission from the coating occurs substantially continuously from about 300° C. up to about 900° C.

Preferably, the engine comprises at least four successive steps, namely an intake step for charging the combustion chamber with at least oxygen and nitrogen, a compression step in which said at least oxygen and nitrogen is compressed, a combustion step in the combustion chamber (comprising advantageously at least partly an expansion step), and an exhaust step for the exhaust of gases present in the combustion chamber, whereby at least during one step selected from the group of the intake step and compression step, the cerium oxide-carbon coating comprising oxides of the followings elements Pr, Nd, La and at least Y and/or Zr, is adapted for uptake of oxygen atoms at temperature comprised between 100 and 400° C.

According to a further embodiment, the cerium oxide-carbon coating comprising oxides of the followings elements Pr, Nd, La and at least Y and/or Zr, is adapted for uptake of hydrogen atoms (especially in the form of hydrogen species H.) at least at temperature comprised between 300 and 700° C. It is expected that some cracking of the fuel is operated at temperature below 500° C. and at pressure higher than $5 \cdot 10^5$ Pa.

According to an embodiment, the presence of Pr, Nd, La and at least Y and/or Zr, oxides in the cerium oxide-carbon containing coating acts advantageously as catalyst for the reaction of oxygen stored in the coating with hydrogen $H_2$ and/or hydrogen species for the formation of water at least at temperature above 500° C. and pressure higher than $30 \cdot 10^5$ Pa.

Advantageous embodiments of the invention comprise one or more of the following characteristics, advantageously a plurality of the following characteristics:

the cerium-carbon containing coating is appropriate so that the hydrocarbon containing fuel is converted into carbon containing species or molecules and into hydrogen and hydrogen species, at least at temperature above 500° C. and pressure above $20 \cdot 10^5$ Pa.

the cerium-carbon containing coating of said inner wall and/or surfaces and/or of the catalytic element or core is appropriate so that the hydrocarbon containing fuel is converted into carbon containing species or molecules and into hydrogen and hydrogen species, at least at temperature above 500° C. and pressure above $20 \cdot 10^5$ Pa.

the cerium oxide-carbon containing coating comprises enough oxides of Pr, La, Nd and at least Y and/or Zr, so as to reduce at least by 50 mole % that hydrogen $H_2$ molecules contacting the cerium-carbon containing coating are converted into free H species and free OH species, at temperature above 500° C. and pressure above $20 \cdot 10^5$ Pa.

the cerium oxide-carbon containing coating comprises enough oxides of Pr, La, Nd and at least Y and/or Zr, so as to reduce at least by 75 mole % that hydrogen $H_2$ molecules contacting the cerium-carbon containing coating is converted into free H species and free OH species, at temperature above 500° C. and pressure above $20 \cdot 10^5$ Pa.

the cerium-carbon containing coating is adapted, after capturing photon emitted by the flame generated by the combustion of the carbon containing fuel, for generating at least adjacent to the cerium-carbon containing coating, spectra covering substantially continuously the whole range of spectra from about 4000 Å up to about 7500 Å.

the cerium-carbon containing coating is adapted for capturing photon emitted by the flame generated by the combustion of the carbon containing fuel, and/or, advantageously and, for generating at least adjacent to the cerium-carbon containing coating, spectra covering substantially continuously the whole range of spectra from about 4000 Å up to about 7500 Å.

the cerium-carbon containing coating is adapted for controlling the number of photons in the combustion chamber during at least the combustion of the carbon containing fuel, said photons being advantageously a mix of photons covering the whole range spectra from about 4000 Å up to about 7500 Å.

the cerium oxide-carbon containing coating of said inner wall and/or surfaces and/or of the catalytic element comprises enough oxides of Pr, La, Nd and at least Y and/or Zr, so as to reduce at least by 50 mole % that hydrogen $H_2$ molecules contacting the cerium-carbon containing coating are converted into free H species and free OH species, at temperature above 500° C. and pressure above $20 \cdot 10^5$ Pa.

the cerium-carbon containing coating comprises at least Y and Zr, advantageously the weight ratio Y/Zr present in the catalyst coating is comprised between 1:10 and 10:1, preferably between 2:10 and 10:2.

the cerium-carbon containing coating comprises some aluminium, preferably in its oxide or hydroxide form and/or in the form of alumino-silicate, whereby the aluminium metal content of the catalyst coating with respect to the total metal weight content of the catalyst coating of metal selected from Al, Ce, Pr, Nd, La and at least Y and/or Zr is comprised between 1 and 10%.

the engine comprises cylinders having an alumino containing face, especially an alumino-silica containing face, said face being at least partly provided with the cerium-carbon containing coating.

the cerium-carbon containing coating of said inner wall and/or surfaces and/or of the catalytic element or core is adapted, after capturing photon emitted by the flame generated by the combustion of the carbon containing fuel, for generating at least adjacent to the cerium-carbon containing coating, spectra covering substantially continuously the whole range of spectra from about 4000 Å up to about 7500 Å.

the cerium-carbon containing coating of said inner wall and/or surfaces and/or of the catalytic element is adapted for capturing photon emitted by the flame generated by the combustion of the carbon containing fuel, and/or, advantageously and, for generating at least adjacent to the cerium-carbon containing coating, spectra covering substantially continuously the whole range of spectra from about 4000 Å up to about 7500 Å.

the cerium-carbon containing coating of said inner wall and/or surfaces and/or of the catalytic element or core is adapted for controlling the number of photons in the combustion chamber during at least the combustion of the carbon containing fuel, said photons being advantageously a mix of photons covering the whole range spectra from about 4000 Å up to about 7500 Å.

the cerium-carbon containing coating of said inner wall and/or surfaces and/or of the catalytic element or core comprises at least Y and Zr, advantageously the weight ratio Y/Zr present in the catalyst coating is comprised between 1:10 and 10:1, preferably between 2:10 and 10:2.

the cerium-carbon containing coating of said inner wall and/or surfaces and/or of the catalytic element or core comprises some aluminium, preferably in its oxide or hydroxide form and/or in the form of alumino-silicate, whereby the aluminium metal content of the catalyst coating of said inner wall and/or surfaces and/or of the catalytic element with respect to the total metal weight content of the catalyst coating of metal selected from Al, Ce, Pr, Nd, La and at least Y and/or Zr is comprised between 1 and 10%.

the relative weight of the metals selected from Ce, Pr, La, Nd, Y and Zr (metal elements which can be present in the coating as oxides and/or hydroxides), expressed as the following respective oxides $CeO_2$, $Pr_6O_{11}$, $La_2O_3$, $Nd_2O_3$, $Y_2O_3$. and $ZrO_2$ of the cerium-carbon containing coating with respect to total weight of the said metals expressed as oxides are:

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17% the catalyst coating further comprises aluminium oxide and/or aluminosilicate.

The catalyst coating has a thickness of less than 500 nm, advantageously less than 300 nm.

The catalyst coating of said inner wall and/or surfaces and/or of the catalytic element or core has a thickness of less than 500 nm, advantageously less than 300 nm.

the catalyst coating has the structure of largest particles with a size greater than 100 nm, with particles with a size of less than 70 nm (preferably less than 30 nm) extending within the void created between the largest particles.

the cerium oxide-carbon containing catalyst of said inner wall and/or surfaces and/or of the catalytic element or core is a catalyst controlling at least the branching reaction of H. species with $O_2$ on the said catalyst, as well as for controlling the branching reaction of .O. species with $H_2$ on the said catalyst.

the catalyst coating of said inner wall and/or surfaces and/or of the catalytic element or core is substantially free or free of Pd, Pt, Rh, Cu and combinations thereof.

at least 50% of the carbon present in the cerium oxide-carbon containing coating is the form of graphene and/or graphane units, possibly with some overlapping portions.

the cerium oxide-carbon containing catalyst of said inner wall and/or surfaces and/or of the catalytic element or core is adapted for controlling the formation of carbon particles in the form of porous graphite, especially in the form of graphene and/or graphane particles, within the combustion chamber, especially on the catalyst coating, and/or for reducing the exhaust of soot particles from the combustion chamber.

the cerium oxide-carbon containing catalyst is adapted for emitting in function of the temperature rays with wave lengths in the violet range, rays in the blue range, rays in the green range, rays in the yellow range, as well as rays within the red range.

the cerium oxide-carbon containing catalyst of said inner wall and/or surfaces and/or of the catalytic element or core is adapted for controlling the formation of carbon particles in the form of porous graphite, especially in the form of graphene and/or graphane particles, within the combustion chamber, especially on the cerium oxide-carbon containing coating, and/or for reducing the exhaust of soot particles from the combustion chamber.

the cerium oxide-carbon containing catalyst is adapted for emitting in function of the temperature rays with wave lengths in the violet range, rays with wavelengths in the blue range, rays with wave lengths in the green range, rays with wave lengths in the yellow range, as well as rays with wave lengths in the red range.

the engine is an at least partly dual stratified charge combustion engine, having advantageously two opposite surfaces provided with the cerium oxide-carbon containing catalyst, said opposite surfaces being preferably piston head surfaces or surfaces of two opposite moving piston heads.

the catalyst coating has the structure of largest particles with a size greater than 100 nm, with particles with a size of less than 70 nm (preferably less than 30 nm) extending within the void created between the largest particles.

the cerium oxide-carbon containing catalyst is a catalyst controlling at least the branching reaction of H. species with $O_2$ on the said catalyst, as well as for controlling the branching reaction of .O. species with $H_2$ on the said catalyst.

the catalyst coating is substantially free or free of Pd, Pt, Rh, Cu and combinations thereof.

at least 50% of the carbon present in the cerium oxide-carbon containing coating is the form of graphene and/or graphane units, possibly with some overlapping portions.

the cerium oxide-carbon containing catalyst is adapted for controlling the formation of carbon particles in the form of porous graphite, especially in the form of graphene and/or graphane particles, within the combustion chamber, especially on the catalyst coating, and/or for reducing the exhaust of soot particles from the combustion chamber.

the cerium oxide-carbon containing catalyst is adapted for emitting in function of the temperature rays with wave lengths in the violet range, rays in the blue range, rays in the green range, rays in the yellow range, as well as rays within the red range.

the cerium oxide-carbon containing catalyst is adapted for controlling the formation of carbon particles in the form of porous graphite, especially in the form of graphene and/or graphane particles, within the combustion chamber, especially on the cerium oxide-carbon containing coating, and/or for reducing the exhaust of soot particles from the combustion chamber.

the cerium oxide-carbon containing catalyst is adapted for emitting in function of the temperature rays with wave lengths in the violet range, rays with wavelengths in the blue range, rays with wave lengths in the green range, rays with wave lengths in the yellow range, as well as rays with wave lengths in the red range.

the engine is an at least partly dual stratified charge combustion engine, having advantageously two opposite surfaces provided with the cerium oxide-carbon containing catalyst, said opposite surfaces being preferably piston head surfaces or surfaces of two opposite moving piston heads.

combinations thereof.

The invention relates also to a process of producing mechanical energy by burning a fuel into an air containing atmosphere in the combustion chamber(s) of an engine of the invention, whereby the cerium-carbon containing catalyst is submitted to a cycle comprising at least a step of oxygen removal from the air containing atmosphere by oxygen capture in the catalyst, and a step of water vapour formation at the catalyst level by reaction of hydrogen or hydrogen species.

The invention further relates to a catalyst precursor for a catalyst of an engine according to the invention, said catalyst being a cerium oxide-carbon containing coating with the oxides of the followings elements Pr, Nd, La and at least Y and/or Zr, is adapted for controlling the formation of H+ species on the cerium oxide-carbon containing coating of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the cerium oxide-carbon containing coating of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%, in which the catalyst precursor is advantageously such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ of the cerium-carbon containing coating with respect to total weight of the said metals expressed as oxides are:

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17%

Advantageously, the catalyst precursor further comprises aluminium oxide and/or aluminosilicate and/or $SiO_2$ and/or silane and/or alumino phospho silicate.

Preferably, the catalyst precursor is in the form of particles with a size of less than 10 μm, advantageously less than 5 μm, preferably less than 200 nm.

The invention further relates to a catalytic support, advantageously comprising aluminium, Ni, Co, etc., preferably made of an aluminium alloy, Ni—Co or Ni—Co—Al alloys, said support being provided with a cerium oxide-carbon containing coating comprising the oxides of the followings elements Pr, Nd, La and at least Y and/or Zr, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The cerium oxide-carbon containing coating has advantageously one or more of the characteristics of the coating disclosed in any one of the engines of the invention as disclosed here above. Said support is advantageously porous and/or flexible. Preferably said support is in the form of a porous membrane. The support is advantageously adhesive or partly adhesive.

The invention further relates to an at least partly stratified combustion chamber comprising at least two successive distinct burning zones, and a gas outlet, for burning a combustible material in presence of air or oxygen enriched air, whereby said chamber comprises a first burning zone provided with at least one inlet for the combustible to be burnt and at least one inlet for the admission of air and/or oxygen enriched air, as well as possibly an inlet for the admission of water vapour, whereby said first burning zone is extended with a channel for collecting all gases and some solid particles issued from the first burning zone, whereby said channel is provided with a series of guiding catalytic channels extending each between a first end directed towards the first burning zone and a second end directed towards the gas outlet of the combustion chamber, said guiding catalytic channels being provided each with a means for forming at least one restricted passage adjacent to the second end, said restricted passage of a guiding catalytic channel having an open surface which is comprised between 25% and 90% of the open surface of the guiding catalytic channel considered adjacent to the first open end, whereby at least the one or more channels of the catalytic system is provided with a cerium oxide-carbon containing coating, said coating of the catalytic system further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ species on the wall of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The combustion chamber is of the open type, meaning that the burning is not operated in a closed chamber with moving piston(s). The combustion chamber is for example a combustor. The combustion chamber has thus an opening through which exhaust gases can flow out of the combustion zone and is associated (like a burner) to ensure a continuous or substantially continuous flame combustion.

Advantageously, the cerium-carbon coating of the guiding catalytic channels is adapted for capturing photons emitted by the flame with wavelength from 6500 to 7500 Å, advantageously for capturing 5 to 25% of the photons with wavelength from 6500 to 7500 Å emitted by the flame having a temperature higher than 800° C.

Preferably, the cerium-carbon coating of the guiding catalytic channels is adapted for ensuring a photon amplified spectrum emission radiation at least at a temperature comprised between 500 and 800° C., said spectrum covering advantageously substantially the whole range from about 4000 Å up to 7500 Å.

According to details of specific embodiments, said embodiments have one or more of the following characteristics:

- the guiding catalytic channels have each a minimal passage with a open cross section of at least 2.5 $cm^2$, advantageously at least 5 $cm^2$, preferably from 5 $cm^2$ to 20 $cm^2$.
- the guiding catalytic channels are made at least partly in a temperature ceramic like material, advantageously comprising aluminium, the wall of which being provided with a catalytic coating with a thickness from 50 µm up to 1 mm, preferably from 100 µm to 5000 µm.
- The combustion chamber which comprises at least 20 distinct and parallel guiding catalytic channels (located in the second burning zone.
- The combustion chamber is associated with a system adapted for the admission of air or oxygen enriched air within the first burning zone and/or in the second burning zone.
- The combustion chamber is associated to at least one injector for the admission of water vapour within the first burning zone.
- the cerium-carbon containing coating comprises at least Y and Zr, advantageously the weight ratio Y/Zr expressed as oxides present in the catalyst coating is comprised between 1:10 and 10:1, preferably between 2:10 and 10:2.
- the cerium-carbon containing coating comprises some aluminium, preferably in its oxide or hydroxide form and/or in the form of aluminosilicate, whereby the aluminium metal content of the catalyst coating with respect to the total metal weight content of the catalyst coating of metal selected from Al, Ce, Pr, Nd, La and at least Y and/or Zr is comprised between 1 and 10%.
- the relative weight of the metals selected from Ce, Pr, La, Nd, Y and Zr, expressed respectively as the following oxides $CeO_2$, $Pr_6O_{11}$, $La_2O_3$, $Nd_2O_3$, $Y_2O_3$. and $ZrO_2$ of the cerium-carbon containing coating of said guiding catalytic channels with respect to total weight of the said metals expressed as oxides are:
  - Ce (as $CeO_2$): 25 to 50%, preferably from 35 to 45%,
  - Pr (as $Pr_6O_{11}$): 2 to 10%, preferably from 2.5 to 6%
  - La (as $La_2O_3$): 15 to 37%, preferably from 20 to 32%
  - Nd (as $Nd_2O_3$): 4 to 15%, preferably from 5 to 13%
  - Y (as $Y_2O_3$): 5 to 15%, preferably from 8 to 12%
  - Zr (as $ZrO_2$): 5 to 25%, preferably from 10 to 17%

The invention relates also to a burning installation comprising at least a combustion chamber according to the invention, as well as an exhaust system provided with means for treating the flue gases coming from the combustion chamber (such a filter, an absorption treatment step, a cleaning step, a heat recovery step, etc.).

The invention relates also to a process of burning coal in presence of air within an installation of the invention, and/or to a process for burning a biomass combustible in presence of air within an installation of the invention.

Fuel burning of waste materials or coal or biomass combustible material is nowadays more problematic, due to pollution regulation (NO, NOx, $SO_2$, etc.), particles, and health problems generated by said pollution.

The invention is using a heterogeneous catalytic system comprising rare earth metals. Problems associated to heterogeneous catalytic system are among other limited catalytic life time, variable working efficiency in function of reaction conditions, etc.

The experience and further searches carried out by the inventor have shown that catalyst could be still be improved, for burning efficiency purposes for a long period of time, as well as for variable working conditions. The new catalyst of the invention enables also an easier control of the burning, while being submitted to variation of load or amount of combustible to be burnt. The system of the invention is thus a dynamic bi functional or hybrid system combining rare earth metal oxides and non rare earth metal oxides, together with carbon particles. The system of the invention uses a catalytic coating having a good thermal resistance, a good catalytic longevity, a good mechanical and chemical resistance, pressure variations. It seems that some metal elements of the catalyst coating are sintered with the metal surface of the combustion chamber (for example of the aluminium alloy of the combustion chamber). It was observed that catalytic efficiency or working was achieved from low temperature (such as temperature of less than 300° C.) up to high temperature (such as temperature higher that 700° C., or even higher than 900° C.). It was observed that catalyst coatings of the invention were suitable to catalyse redox reactions on and in the porous catalytic coating. It was also observed that due to the catalyst coating of the invention, some flame quenching could be prevented, such as side wall quenching and/or tube quenching (channel quenching). It was also observed that ionisation current was better conserved adjacent to the catalyst coating. Without being bound to any theory, it is expected that the catalyst coating ensures within the free volume of the combustion chamber a thicker intermediate layer between the flame plasma and the catalyst coating of the invention, with respect to a combustion chamber not provided with the catalyst coating. Without being bound to any theory, it is expected that the catalyst coating of the invention ensures a more controlled ionisation level, with reduced chemi ionisation peak and thermal ionisation peak, even in presence of large excess of air, such as with lambda value of more than 1.4, or even 1.5.

The control of chemical catalysis is disclosed in U.S. Pat. No. 7,998,538 (California Institute of Technology). As stated in said documents, many catalytic reactions have a temperature threshold. Prior art methods utilise macroscopic heat source to provide heat for such reactions and typically entail gross convection, gross conduction, or gross radiation. Inherent with the use of such conventional methods of heating, is the difficulty of having control of the temperature of a catalyst, the vicinity of the catalyst and/or the heat applied, both temporally and spatially.

Carbon containing coating in the present invention means a coating comprising graphite carbon, most preferably like as 2dimensional-graphene and/or graphane structures (such as structures with a larger Raman intensity peak between 2600-2700 Raman shift (1/cm) than the Raman peak intensity between 1500-1700 Raman shift (1/cm). The carbon containing coating of the invention is preferably a coating for which at least 30% by weight of the carbon is in a form of 2dimensional-graphene and/or graphane structure, advantageously mixed with graphite having the structure of nanotubes (such as single wall carbon nano tubes, double wall carbon nano tubes or multi wall carbon nano tubes) and/or fullerene and/or combinations thereof.

According to an advantageous embodiment, the cerium-carbon coating of said inner wall and/or of the catalytic element is adapted for ensuring a photon amplified spectrum emission radiation at least at a temperature comprised between 500 and 800° C., said spectrum covering advantageously substantially the whole range from about 4000 Å up to 7500 Å (i.e. ensuring thus emission of rays in the violet range (wave length from 4000 Å up to about 4500 Å), in the blue range (wave length from 4500 Å up to 5200 Å), in the green range (from about 5200 Å up to about 5700 Å), in the yellow range (from about 5700 Å up to about 5900 Å), in the orange range (from about 5900 Å up to 6250 Å) and in the red range (from about 6250 Å up to about 7500 Å). The emission is advantageously controlled so that emission from the coating occurs substantially continuously from about 300° C. up to about 900° C.

According to a further embodiment, the cerium oxide-carbon coating of said inner wall and/or of the catalytic element comprising oxides of the followings elements Pr, Nd, La and at least Y and/or Zr, is adapted for uptake of hydrogen atoms (especially in the form of hydrogen species H.) at least at temperature comprised between 300 and 700° C. It is expected that some cracking of the combustible material (gazeous or small particles) is operated in the second burning zone at temperature below 500° C. and at pressure lower than $5 \cdot 10^5$ Pa.

According to an embodiment, the presence of Pr, Nd, La and at least Y and/or Zr, oxides in the cerium oxide-carbon containing coating of said guiding channels acts advantageously as catalyst for the reaction of oxygen stored in the coating with hydrogen $H_2$ and/or hydrogen species for the formation of water at least at temperature above 500° C. and pressure lower than $5 \cdot 10^5$ Pa, such as lower than $2 \cdot 10^5$ Pa.

Advantageous embodiments of the invention comprise one or more of the following characteristics, advantageously a plurality of the following characteristics:

the cerium oxide-carbon containing coating comprises enough oxides of Pr, La, Nd and at least Y and/or Zr, so as to reduce at least by 75 mole % that hydrogen $H_2$ molecules contacting the cerium-carbon containing coating is converted into free H species and free OH species, at temperature below 900° C. and pressure below $5 \cdot 10^5$ Pa.

the cerium-carbon containing coating is adapted, after capturing photon emitted by the flame generated by the combustion of the carbon containing fuel, for generating at least adjacent to the cerium-carbon containing coating, spectra covering substantially continuously the whole range of spectra from about 4000 Å up to about 7500 Å.

the cerium-carbon containing coating is adapted for capturing photon emitted by the flame generated by the combustion of the carbon containing fuel, and/or, advantageously and, for generating at least adjacent to the cerium-carbon containing coating, spectra covering substantially continuously the whole range of spectra from about 4000 Å up to about 7500 Å.

the cerium-carbon containing coating is adapted for controlling the number of photons in the combustion chamber during at least the combustion of the carbon containing fuel, said photons being advantageously a mix of photons covering the whole range spectra from about 4000 Å up to about 7500 Å.

the cerium-carbon containing coating comprises at least Y and Zr, advantageously the weight ratio Y/Zr present in the catalyst coating is comprised between 1:10 and 10:1, preferably between 2:10 and 10:2.

the cerium-carbon containing coating comprises some aluminium, preferably in its oxide or hydroxide form and/or in the form of alumino-silicate, whereby the aluminium metal content with respect to the total metal weight content of the catalyst coating of metal selected from Al, Ce, Pr, Nd, La and at least Y and/or Zr is comprised between 1 and 10%.

the relative weight of the metals selected from Ce, Pr, La, Nd, Y and Zr (metal elements which can be present in the coating as oxides and/or hydroxides), expressed as the following respective oxides $CeO_2$, $Pr_6O_{11}$, $La_2O_3$, $Nd_2O_3$, $Y_2O_3$. and $ZrO_2$ of the cerium-carbon containing coating with respect to total weight of the said metals expressed as oxides are:

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17% the catalyst coating further comprises aluminium oxide and/or aluminosilicate.

the catalyst coating of said inner wall and/or of the catalytic element has a thickness of less than 500 nm, advantageously less than 300 nm.

the catalyst coating has the structure of largest particles with a size greater than 100 nm, with particles with a size of less than 70 nm (preferably less than 30 nm) extending within the void created between the largest particles.

the cerium oxide-carbon containing catalyst is a catalyst controlling at least the branching reaction of H. species with $O_2$ on the said catalyst, as well as for controlling the branching reaction of .O. species with $H_2$ on the said catalyst.

the catalyst coating is substantially free or free of Pd, Pt, Rh, Cu and combinations thereof.

at least 50% of the carbon present in the cerium oxide-carbon containing coating is the form of graphene and/or graphane units, possibly with some overlapping portions.

the cerium oxide-carbon containing catalyst is adapted for controlling the formation of carbon particles in the form of porous graphite, especially in the form of graphene and/or graphane particles, within the combustion chamber, especially on the catalyst coating, and/or for reducing the exhaust of soot particles from the combustion chamber.

the cerium oxide-carbon containing catalyst is adapted for emitting in function of the temperature rays with wave lengths in the violet range, rays in the blue range, rays in the green range, rays in the yellow range, as well as rays within the red range.

the cerium oxide-carbon containing catalyst is adapted for controlling the formation of carbon particles in the form of porous graphite, especially in the form of graphene and/or graphane particles, within the combustion chamber, especially on the cerium oxide-carbon containing coating, and/or for reducing the exhaust of soot particles from the combustion chamber.

the cerium oxide-carbon containing catalyst is adapted for emitting in function of the temperature rays with wave lengths in the violet range, rays with wavelengths in the blue range, rays with wave lengths in the green range, rays with wave lengths in the yellow range, as well as rays with wave lengths in the red range.

combinations thereof.

A further object of the invention is a burning catalytic wall comprising a support comprising a cerium oxide-carbon containing burning catalyst coating, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

Such a burning catalytic wall is for example mounted in a removable way in a combustion chamber. The wall can be provided with one or more openings or passages.

Still another subject matter of the invention relates to a regeneration support for regeneration of a burning catalytic wall comprising a catalytic support comprising a cerium oxide-carbon containing burning catalyst coating, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25% in which said regeneration support comprises a top layer with metals selected from Ce, Pr, La, Nd, Y and Zr, whereby the said metals expressed as oxide $CeO_2$, $Pr_6O_{11}$, $La_2O_3$, $Nd_2O_3$, $Y_2O_3$. and $ZrO_2$ with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$. and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

Such a support is for example mounted in a removable way in a combustion chamber or in pretreatment chamber connected to the combustion chamber. The catalytic support can be provided with one or more openings or passages.

The use of such regeneration support is preferably use with water vapour, so as create a water vapour charged with some metals in their oxide and/or hydroxide forms.

DETAILED DESCRIPTION OF PREFERRED EMBODIMENTS

Figure 1:
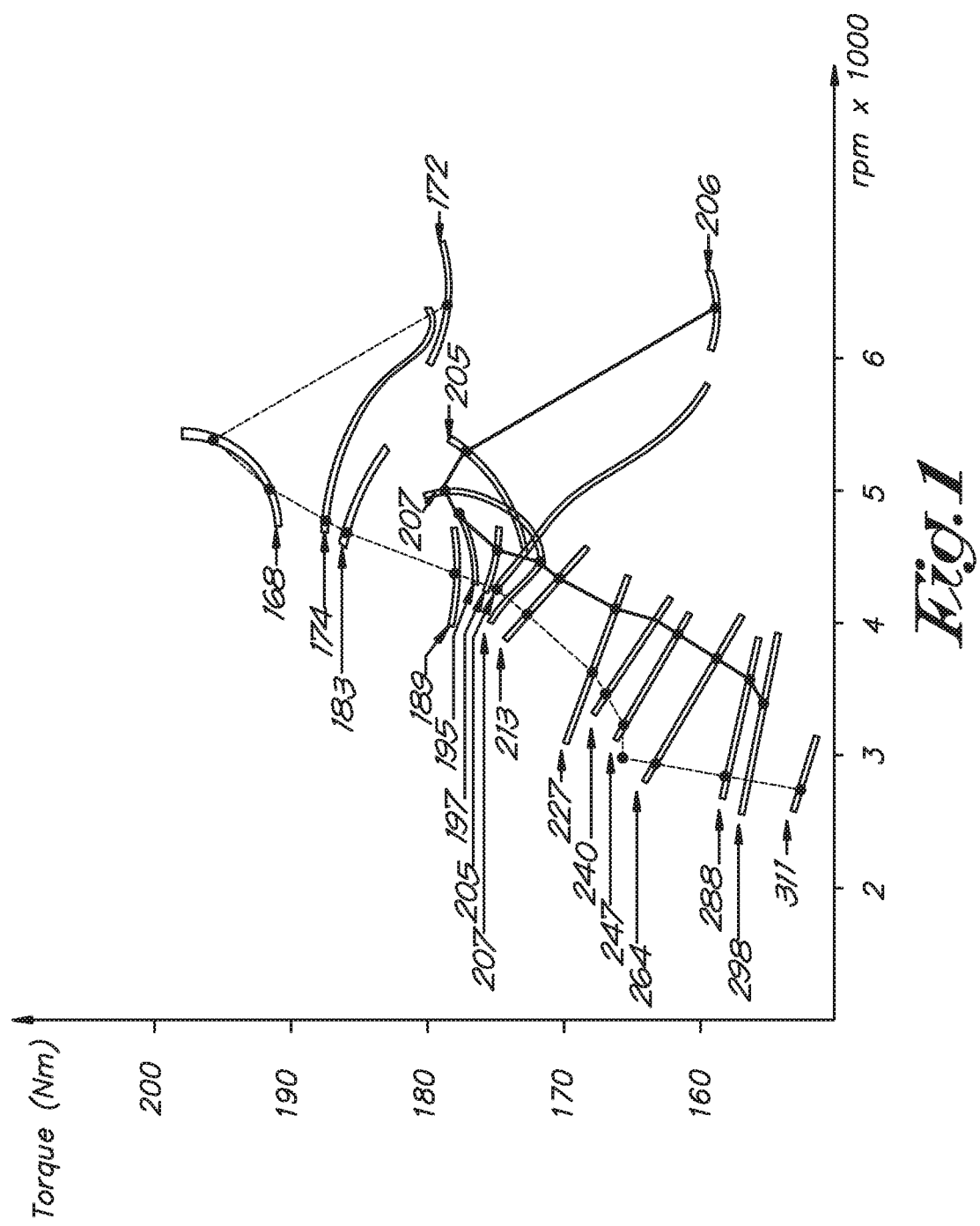
FIG. 1 is a comparative engine bench testing graph showing the torque versus the rpm for an engine of the invention with respect to the same engine without the catalyst coating.

The present invention is an improvement of the technology disclosed in WO2006017915, U.S. Pat. Nos. 7,482,303, 7,188,470, EP1590555B1, and U.S. Pat. No. 7,723,257, the content of which is incorporated herein by reference.

Homogeneous charge combustion is according to the state of the art, the way to increase fuel efficiency of the car engine. Car companies have then developed several systems with computer control. However, all said systems have shown their limits, as unable to achieve correctly the goals of consumption, particle emission, etc.

The invention has for subject matter an engine provided with a heterogeneous catalyst enabling a live control of the combustion, even in case of large regime variation.

The combustion chamber of the engine has been coated with a catalyst precursor.

The precursor used was a mix of nano scale particles possibly dispersed in a wax or liquid, the composition of said mix being:

1. nano carbon primary particles with a size of less than 10 nm (possibly agglomerated into a structure with a size of less than 500 nm. Said nano carbon primary particles are present in the precursor mix at a rate of 10 to 50% by weight, advantageously from 15 to 30% by weight, preferably about 20% by weight. Instead of using carbon nano particles as such, a wax possibly with carbon nano particles can be used. The carbon particles are preferably comprising some particles forming a two dimensional graphene and/or graphane structure, most particularly a mono layered two dimensional graphene and/or graphane structure.

2. a mix of metal oxide particles, especially of nanoparticles (particles with a size of less than 200 nm, preferably at least partly less than 50 nm. Said mix of metal particles comprises advantageously with respect to the total mix of said metal oxide particles (as weight %):

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17%
Al (as $Al_2O_3$): 0 to 10%, preferably from 1% to 5%
Si (as $SiO_2$): 0 to 10%, preferably from 0.5 to 5% (Said silicon can be in the form of liquid or soluble tetra ethoxy silane, in a solvent system, such as methanol, ethanol, etc.)

The mix of nano oxide particles is advantageously a mix of nano oxide particles with a weight average size of more than 100 nm and of nano oxide particles with a weight average size of less than 70 nm, the weight ratio nano oxide particle with a weight average size greater than 100 nm/nano particles with a weight average size lower than 70 nm being comprised between 5:1 and 1:5, advantageously between 4:1 and 2:1.

3. possibly a wax or liquid system, for enabling some adhesion of the particles on the surface to be coated, said wax or liquid being preferably molecules comprising carbon and hydrogen, as well as preferably oxygen atoms.

the weight ratio wax/mix of metal oxide particles is advantageously greater than 2, such as comprised from 2.5 up to 6. The precursor was used for coating (for example by brushing, blowing, spraying, etc.) the wall of the combustion chambers and piston heads of the engine. The engine was made in an aluminium-based alloy. After said coating, the engine was driven with a fuel for 30 minutes. After said driving of the engine, the excess of catalyst was removed.

The catalyst coating had a thickness of less than about 70 nm, with metal particles homogeneously dispersed. On the tube face of the combustion cylinders, substantially no catalyst was present or catalyst with a very small thickness.

The engine was then tested.

The following observations were thus found:
high thermal stability of the catalyst
high pressure stability
high hydrogen stability
working of the engine possible with different cetane number or octane number
high ionic conductivity of the coating
possible ignition control at different compression ratio from 6 up to more than 15, such as 20 or more, for example 22;
possibility to burn at least partly the carbon and the hydrogen from the fuel separately, namely a large portion of the fuel carbon in the volume of the chamber (comprising the plasma zone adjacent to the catalyst coating(s), i.e. in a N2 enriched environment with respect to air), and a large portion of the fuel hydrogen on or in the catalyst coating(s) (i.e. namely in a O2 rich environment or in a reduced N2 environment with respect to air)
High oxygen storage capacity, with high uptake and release oxygen rate
High hydrogen storage capacity
Possible down sizing of the filter, due to less small particle emissions, as well as down sizing of the three way catalyst exhaust
Possibility to use a filter with large pore size
Possibility to reduce pressure drop in the exhaust, at the level of the filter, as well as at the level of the three way catalyst
quicker activation of the three way catalyst
stable working of the catalyst during time, whereby less catalyst rejuvenation is needed
possible working of the engine with lambda value higher than 1.3, such as higher than 1.4, such as from 1.4 to 1.3, such as from 1.5 to 2.1.
improved post treatment
less NOx
low HC content in the exhaust gases
less carbon particles exhaust (especially substantially no small sized carbon particles exhaust, such as substantially no carbon particle with a size of less than 5 μm)
no soot formation in the combustion chamber
no soot deposit in the exhaust pipe
high water vapour exhaust.
Lower fuel consumption
Higher global amount of free electrons in the combustion chamber The combustion was a dual stratified combustion with two opposite surfaces provided with a cerium-carbon containing coating.

The engine was working with a fuel direct injection system, as well as preferably with a liquid water (as micro droplets) direct injection into the combustion chamber, such system are for example systems like the K-Jetronic range of systems of Bosch GmbH and WI (Water Injection) of Bosch GmbH. Water injection technologies are disclosed in U.S. Pat. Nos. 5,174,247, 6,067,964 and 6,092,514.

The following results were observed: lower fuel consumption, lower NOx emission, lower small carbon particles emission, better, improved working of the engine (less vibrations), better working of the filter and exhaust treatment system, etc.

The engine was an engine with compression ignition. It was observed that it was possible to increase the compression ratio before ignition in a spark ignition engine as well as for compression ignition engine, with respect to currently used ignition compression ratio. Moreover, possible ignition was possible with a spark plug within a large range of compression ratio.

As the pressure drop in the exhaust converter system and filter was reduced with respect to the pressure drop in the exhaust converter system and filter of the current engines, while ensuring a high level of removal of carbon particles and/or conversion of toxic NOx molecules, a better air filling of the combustion chamber was possible with the engine of the invention. Moreover, when the air intake valve and the exhaust valve are both in open position, air can more easily flow through the combustion chamber of the engine of the invention, ensuring in this way an oxygen uptake by the catalyst coating, as well as a cooling of the combustion chamber, and even a high scavenging of exhaust gases.

In view of the lower pressure drop in the exhaust converter system, exhaust gases can be better used for driving into rotation of a turbine (for which ever purposes), when required and/or for EGR (exhaust gas recycling) purposes. Due to the low level of carbon particles content, EGR is better performing and the EGR system is not subject to clogging problems The engine could also be an engine with spark ignition or with other means for controlling the ignition.

The engine can also be provided with Bosch like injectors for injecting water drops or droplets and/or water vapour in the air intake (before and/or after the air butterfly valve in the manifold, and/or directly within the combustion chamber).

The catalyst coating of the invention can thus be considered as being a highly coordinated selective, oxidising and reducing self supported redox catalytic system, whereby selective oxidising and selective reducing can vary or be controlled in function of temperature and photon emission.

FIG. 1 is a comparative engine bench testing graph showing the torque (Nm) versus the rpm for an engine of the invention (dashed lines or catalysed burning) with respect to the same engine without the catalyst coating (continuous line, or conventional burning). Brake specific fuel consumption levels are expressed in grams (double lines). The tested vehicle was a Volvo engine, 5 cylinders, 2.4 l, with natural aspiration and porthole injection.

With respect to the embodiment of FIGS. 2A, 2B, 3 and 4, the following can be stated.

The invention has for subject matter a piston opposite engine provided with a heterogeneous catalyst enabling a live control of the combustion, even in case of large regime variation.

The combustion chamber of the engine associated with two reciprocating pistons is provided with an intermediary catalytic open element coated with a catalyst or a catalyst precursor. Possibly, the inner wall and/or surfaces of the cylinder is also provided with a catalytic coating or catalyst precursor.

Figure 2A:
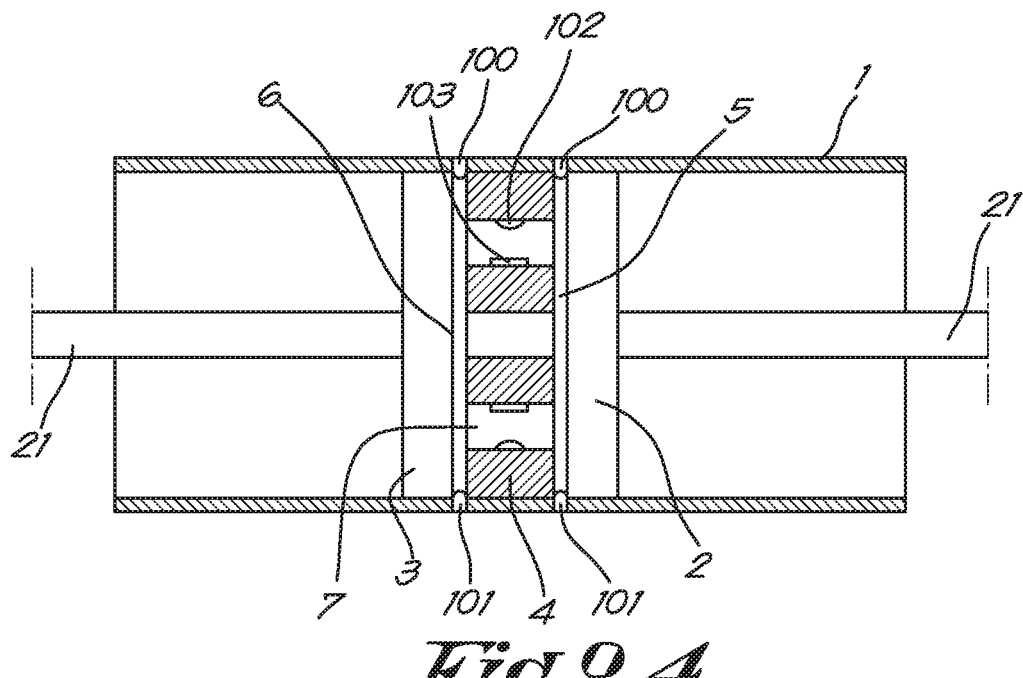
FIG. 2A is a schematic view of one cylinder of a piston-opposite engine with the piston in a close position.
Figure 2B:
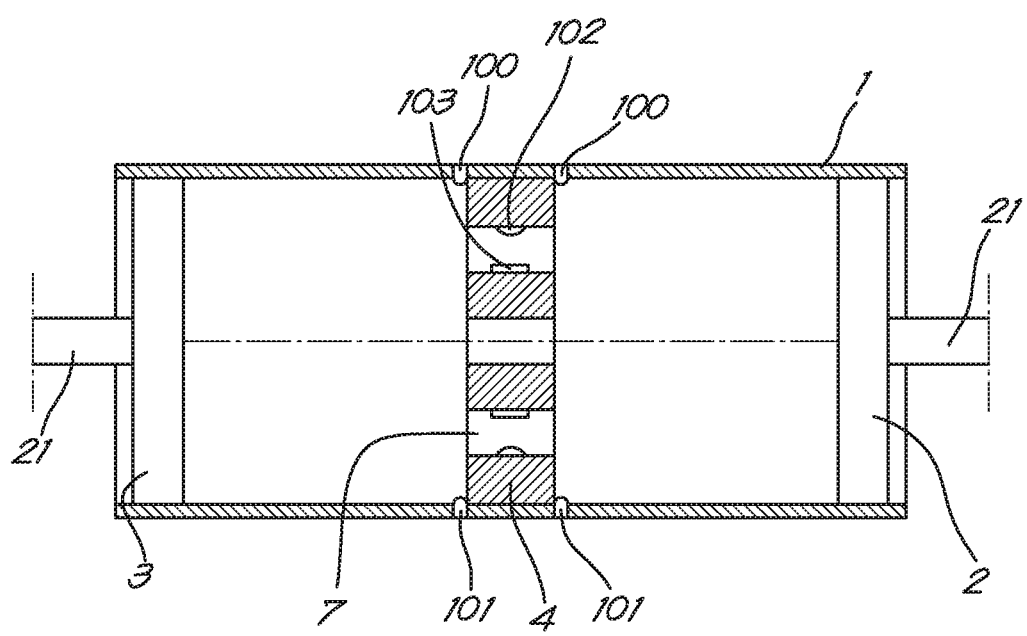
FIG. 2B is a schematic view of one cylinder of a piston-opposite engine with the piston in an away position.
Figure 3:
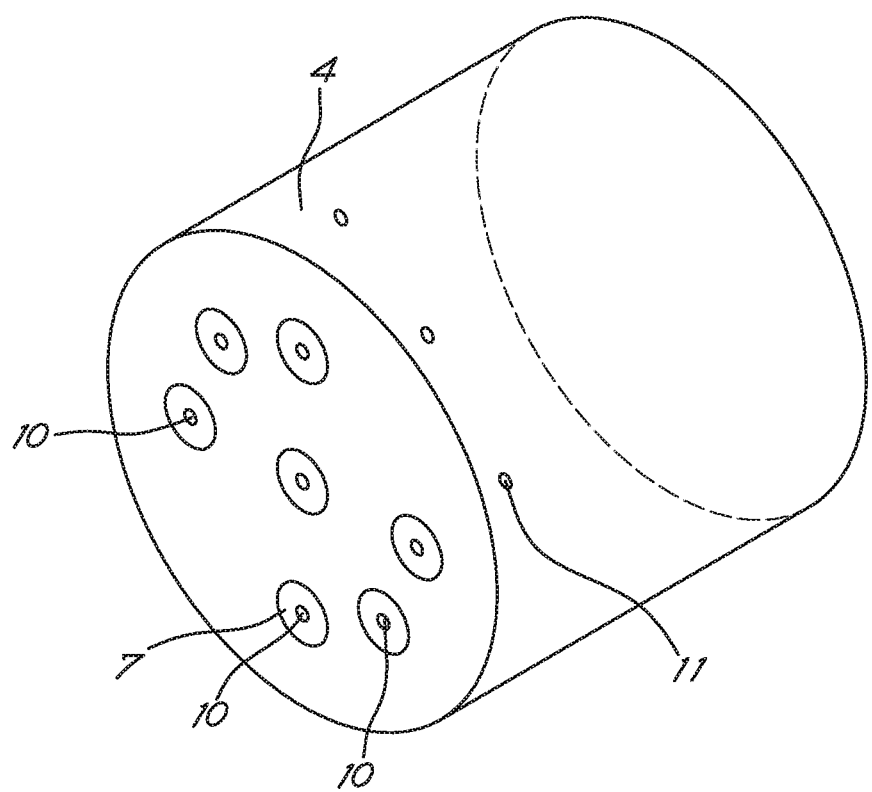
FIG. 3 is an enlarged view of the catalytic element present in the cylinder.

FIG. 2A or 2B shows a cylinder 1 of a piston opposite engine (comprising a plurality of cylinders mounted parallel to each other). Each cylinder 1 is associated to a first piston 2 with a first cross section with a first diameter is moving along a first axis A and a second piston 3 with a second cross section with a second diameter equal or different from the first diameter moving along a second axis parallel to the first axis (in this case corresponding to the axis A), whereby said first piston 2 and said second piston 3 are reciprocating along to each other between a first position (FIG. 2A) in which the said first and second pistons 2,3 are close the one to the other in the cylinder considered 1, whereby defining in said cylinder considered a small volume between the said first and second pistons 2,3, and a second position (FIG. 2B) in which the first and second pistons are away the one with respect to the other so as to define therebetween a second volume in the cylinder considered which is greater than the first volume, whereby each cylinder is provided with a catalytic open element 4 located within the small volume of the cylinder considered, said open element 4 separating the said first volume into a first zone 5 directed towards the first piston 2 and a second zone 6 directed towards the second piston 3, while defining one or more open channels 7 extending between the first zone 5 and the second zone 6, said one or more passages 7 defining an open cross section defining an open surface within a plane perpendicular to the first axis and second axis which is comprised between 0.2 and 0.8 times (advantageously 0.3 and 0.7, preferably between 0.4 and 0.6, such as from 0.5 to 0.6) the average cross section of the first and second piston, whereby at least the one or more channels of the catalytic element is provided with a cerium oxide-carbon containing coating 8.

The catalytic element is provided with a injector 10 for fuel injection, and another 11 for water vapour injection.

The combustion chamber comprises one or more fuel injectors 100, a water vapour injectors 101, spark plugs 102, and sensors 103, each comprising at least a core provided with a cerium oxide-carbon containing coating, said coating of the element further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ species on the wall and/or surfaces of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall and/or surfaces of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The catalytic element or core is for example a support (alumino silicate, alumina silico phosphate, ceramic, etc.) provided with a catalyst coating or a precursor coating suitable for generating a catalyst coating.

The precursor used was a mix of nano scale particles possibly dispersed in a wax or liquid, the composition of said mix being:

1. nano carbon primary particles with a size of less than 10 nm (possibly agglomerated into a structure with a size of less than 500 nm. Said nano carbon primary particles are present in the precursor mix at a rate of 10 to 50% by weight, advantageously from 15 to 30% by weight, preferably about 20% by weight. Instead of using carbon nano particles as such, a wax possibly with carbon nano particles can be used. The carbon particles are preferably comprising some particles forming a two-dimensional graphene and/or graphane structure, most particularly a mono layered two dimensional graphene and/or graphane structure.

2. a mix of metal oxide particles, especially of nanoparticles (particles with a size of less than 200 nm, preferably at least partly less than 50 nm. Said mix of metal particles comprises advantageously with respect to the total mix of said metal oxide particles (as weight %):

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17%
Al (as $Al_2O_3$): 0 to 10%, preferably from 1% to 5%
Si (as $SiO_2$): 0 to 10%, preferably from 0.5 to 5% (Said silicon can be in the form of liquid or soluble tetra ethoxy silane, in a solvent system, such as methanol, ethanol, etc.)

The mix of nano oxide particles is advantageously a mix of nano oxide particles with a weight average size of more than 100 nm and of nano oxide particles with a weight average size of less than 70 nm, the weight ratio nano oxide particle with a weight average size greater than 100 nm/nano particles with a weight average size lower than 70 nm being comprised between 5:1 and 1:5, advantageously between 4:1 and 2:1.

3. possibly a wax or liquid system, for enabling some adhesion of the particles on the surface to be coated, said wax or liquid being preferably molecules comprising carbon and hydrogen, as well as preferably oxygen atoms.

the weight ratio wax/mix of metal oxide particles is advantageously greater than 2, such as comprised from 2.5 up to 6.

The precursor was used for coating (for example by brushing, blowing, spraying, etc.) the wall and/or surfaces of the combustion chambers and piston heads of the engine. The engine was made in an aluminium-based alloy. After said coating, the engine was driven with a fuel for 30 minutes. After said driving of the engine, the excess of catalyst was removed. The catalyst coating had a thickness of less than about 70 nm, with metal particles homogeneously dispersed. On the tube face of the combustion cylinders, substantially no catalyst was present or catalyst with a very small thickness.

The engine of the invention will have the advantages disclosed in the article: "Opposed-piston engines: the future of internal combustion engines?", Kalke Jakub et al.

The engine will moreover have the following advantages:
high thermal stability of the catalyst
high pressure stability
high hydrogen stability
working of the engine possible with different cetane number or octane number
high ionic conductivity of the coating
possible ignition control at different compression ratio from 6 up to more than 15, such as 20 or more, for example 22;

possibility to burn at least partly the carbon and the hydrogen from the fuel separately, namely a large portion of the fuel carbon in the volume of the chamber (comprising the plasma zone adjacent to the catalyst coating(s), i.e. in a $N_2$ enriched environment with respect to air), and a large portion of the fuel hydrogen on or in the catalyst coating(s) (i.e. namely in a $O_2$ rich environment or in a reduced $N_2$ environment with respect to air)

High oxygen storage capacity, with high uptake and release oxygen rate

High hydrogen storage capacity

Possible down sizing of the filter, due to less small particle emissions, as well as down sizing of the three way catalyst exhaust Possibility to use a filter with large pore size Possibility to reduce pressure drop in the exhaust, at the level of the filter, as well as at the level of the three way catalyst quicker activation of the three way catalyst stable working of the catalyst during time, whereby less catalyst rejuvenation is needed possible working of the engine with lambda value higher than 1.3, such as higher than 1.4, such as from 1.4 to 1.3, such as from 1.5 to 2.1.

improved post treatment less NOx low HC content in the exhaust gases high steam, superheated steam formation less carbon particles exhaust (especially substantially no small sized carbon particles exhaust, such as substantially no carbon particle with a size of less than Sum)

no soot formation in the combustion chamber no soot deposit in the exhaust pipe high water vapour exhaust.

Lower fuel consumption

Higher global amount of free electrons in the combustion chamber

The combustion was a dual stratified combustion with two opposite surfaces provided with a cerium-carbon containing coating.

The catalyst coating will reacts differently in function of the oxygen content present within the combustion chamber, thus during the intake and compression phases (oxygen rich atmosphere), and during the combustion and exhaust phases (oxygen poor or depleted atmosphere).

The engine was working with a fuel direct injection system, as well as preferably with a liquid water (as micro droplets) direct injection into the combustion chamber, such system are for example systems like the K-Jetronic fuel range of systems of Bosch GmbH and WI (Water Injection) of Bosch GmbH. Water injection technologies are disclosed in U.S. Pat. Nos. 5,174,247, 6,067,964 and 6,092,514.

The following results were observed: lower fuel consumption, lower NOx emission, lower small carbon particles emission, better, improved working of the engine (less vibrations), better working of the filter and exhaust treatment system, etc.

The engine was an engine with compression ignition. It was observed that it was possible to increase the compression ratio before ignition in a spark ignition engine as well as for compression ignition engine, with respect to currently used ignition compression ratio. Moreover, possible ignition was possible with a spark plug within a large range of compression ratio.

As the pressure drop in the exhaust converter system and filter was reduced with respect to the pressure drop in the exhaust converter system and filter of the current engines, while ensuring a high level of removal of carbon particles and/or conversion of toxic NOx molecules, a better air filling of the combustion chamber was possible with the engine of the invention. Moreover, when the air intake system (inlet canals or intake ports) and the exhaust valve are both in open position, air can more easily flow through the combustion chamber of the engine of the invention, ensuring in this way an oxygen uptake by the catalyst coating, as well as a cooling of the combustion chamber, and even a high scavenging of exhaust gases.

In view of the lower pressure drop in the exhaust converter system, exhaust gases can be better used for driving into rotation of a turbine (for which ever purposes), when required and/or for EGR (exhaust gas recycling) purposes. Due to the low level of carbon particles content, EGR is better performing and the EGR system is not subject to clogging problems The engine could also be an engine with spark ignition or with other means for controlling the ignition.

The engine can also be provided with Bosch like injectors for injecting water drops or droplets and/or water vapour in the air intake (before and/or after the air butterfly valve in the manifold, and/or directly within the combustion chamber).

The catalyst coating of the invention can thus be considered as being a highly coordinated selective, oxidising and reducing self supported redox catalytic system, whereby selective oxidising and selective reducing can vary or be controlled in function of temperature and photon emission.

The opposite pistons engine can also be of the type not using wobble plates for transmitting the power generated by the fuel combustion and the displacement of the pistons to a driving axis. The opposite pistons engine can also be of the type "fairbanks-Morse" diesel engine.

Figure 4:
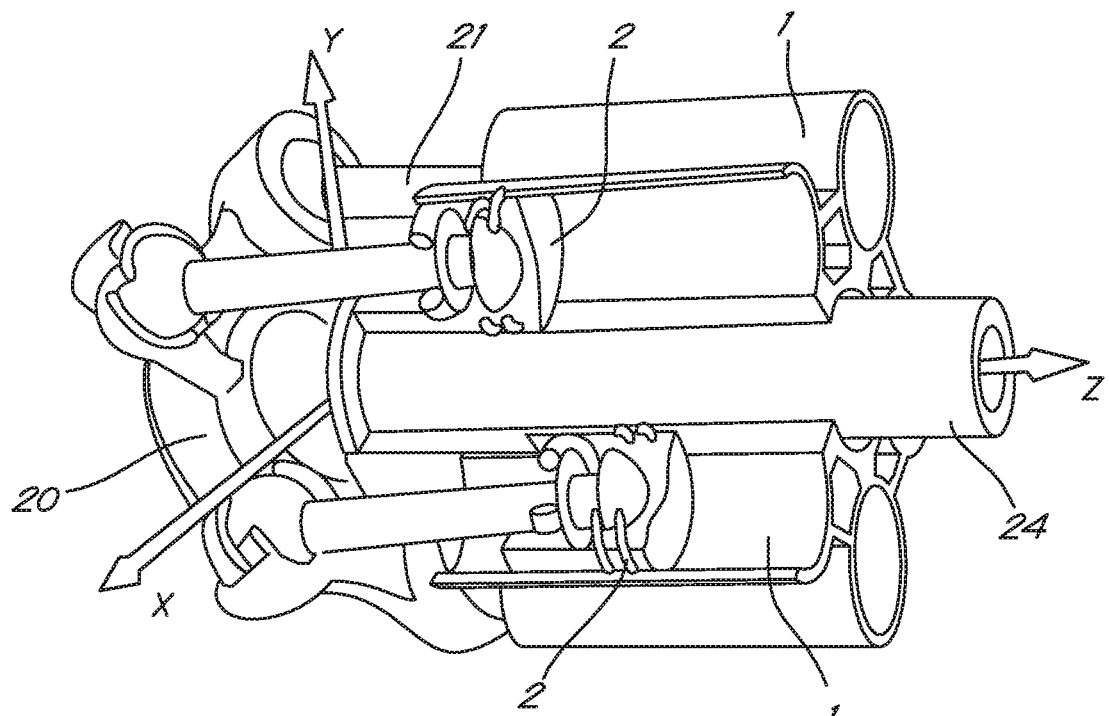
FIG. 4 is a schematic perspective view of a wobble plate connected to a series of pistons, said wobble plate being mounted on one end of the plurality of cylinders.

FIG. 4 shows in perspective a wobble plate 20 connected by means rods 21 (with spherical head enabling a rotation of the head within a recess of a arm of the wobble plate) to five pistons (2 or 3) moving in distinct cylinders 1, the said wobble plate being located at one end of said cylinders 1. Another wobble plate is connected similarly to the other pistons moving in the cylinders 1. The two wobble plates (also known as swash-plates) are linked the one to the other by a central axis 24 which is driven into rotation by the movement of the wobble plate.

Wobble plates opposite pistons engines are for example of the type: Lamplough axial engine (see douglas-self.com; U.S. Pat. No. 1,765,167); Wishon (U.S. Pat. No. 1,476,275), Sterling axial engine (U.S. Pat. No. 2,080,846), etc.

Figure 5:
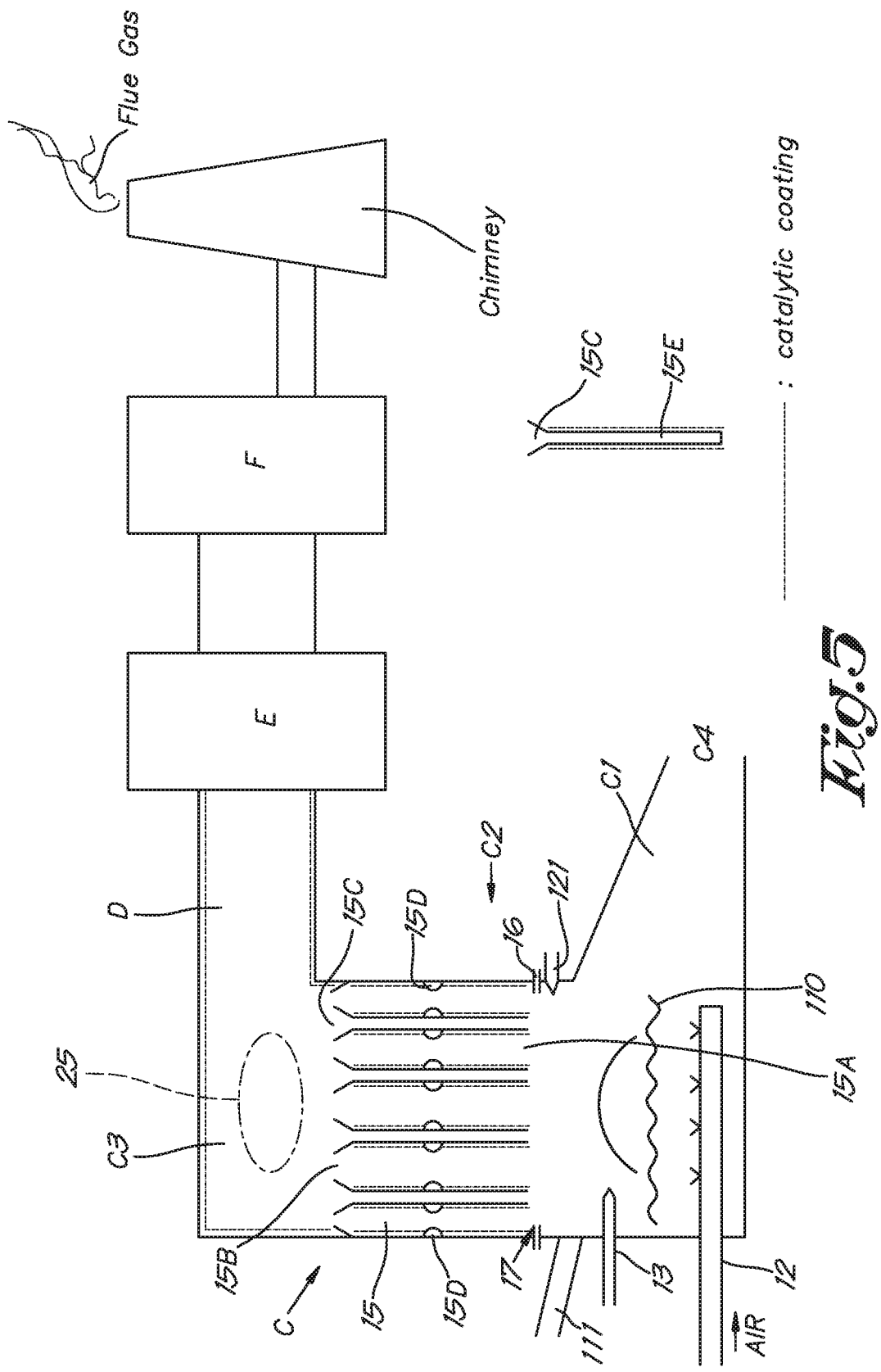
FIG. 5 is a schematic view of a burning installation of the invention.

FIG. 5 shows an incineration plant comprising an at least partly stratified combustion chamber C in the form of a fluidised bed, a flue gas collecting system D for collecting the flue gases exhausted by the combustion of the combustible material in the combustion chamber C, a heat exchanger E, and a flue gases exhaust treatment system F comprising a system F1 for treating flue gases with a dry absorbent (such calcium hydroxide) and a filter system F2 for recovering solid particles still present in the flue gases.

The combustion chamber C comprising at least two successive distinct burning zones C1,C2, a flue gas outlet C3, and an ash outlet system C4. The combustion chamber C is adapted for burning a combustible material in presence of air or oxygen enriched air, whereby said chamber comprises a first burning zone C1 (a fluid bed burning zone) provided with at least one inlet 111 for the combustible material to be burnt (admitted above the fluid bed support 110) and at least one inlet 12 for the admission of air and/or oxygen enriched air below the fluid bed support 110 for keeping the material to be burnt in suspension above the fluid bed support 110. The first burning zone is also provided with an inlet 13 for the admission of water vapour above the fluidised bed, preferably just before flue gases enters the second burning zone C2.

Said first burning zone C1 is extended with a channel system forming the second burning zone C2, said channel system collecting all gases and some solid particles issued from the first burning zone C1, whereby said channel system is provided with a series of guiding catalytic channels 15 extending each between a first end 15A directed towards the first burning zone C1 and a second end 15B directed towards the gas outlet D of the combustion chamber C, said guiding catalytic channels 15 being provided each with a means 15C (located adjacent to the end 15B of the guiding catalytic channel 15), 15D (located in between the ends 15A and 15B, post particularly between the end 15A and the means 15C) for forming at least one restricted passage adjacent to the second end 15B, as well as within (such as at half way) the guiding channels, said restricted passage of a guiding catalytic channel having an open surface which is comprised between 25% and 90% of the open surface of the guiding catalytic channel considered adjacent to the first open end 15A. The restricted passage of a guiding channel formed by the means 15C is for example from 40 to 50% of the open passage of said guiding channel at its end 15A, while the restricted passage of a guiding channel at the level of the means 15D is for example from 51 to 65% of the open passage of said guiding channel at its end 15A.

The channels 15 can be formed by placing elements 15E adjacent the one to the other, so as to define there between channels 15. The elements 15E are advantageously mounted mobile on a support, so as to enable an easy replacement of one element 15E, when required. The elements 15E can be provided with a precursor coating or a catalytic coating at the production plant.

The channels of the catalytic channel system C2 (forming the second burning zone) is provided with a cerium oxide-carbon containing coating, said coating of the channels further comprising at least comprising oxides of the followings elements Pr, Nd, La and at least Y and/or Zr, whereby said cerium oxide-carbon containing coating with the oxides of the followings elements Pr, Nd, La and at least Y and/or Zr, is adapted for controlling the formation of H+ species on the wall of the chamber, while controlling the hydrogen branching reactions by catalysing the use of oxygen atoms from Ce, Pr, Nd, La and at least Y and/or Zr oxides for reacting with hydrogen $H_2$ for the formation of $H_2O$ on the wall of the chamber, whereby the weight metal content of the metal element selected from Y, Zr and mix thereof expressed as oxide in the total metal weight content of metal elements selected from Ce, Pr, Nd, La, Y and Zr expressed as oxide is at least 10%, advantageously at least 15%, preferably from 16 to 40%, most preferably from 20 to 30%.

The cerium-carbon coating of the guiding catalytic channels 15 forming the second burning zone is adapted for capturing photons emitted by the flame with wavelength from 6500 to 7500 Å, advantageously for capturing 5 to 25% of the photons with wavelength from 6500 to 7500 Å emitted by the flame having a temperature higher than 800° C.

Advantageously, the cerium-carbon coating of the guiding catalytic channels is adapted for ensuring a photon amplified spectrum emission radiation at least at a temperature comprised between 500 and 800° C., said spectrum covering advantageously substantially the whole range from about 4000 Å up to 7500 Å.

The guiding catalytic channels have each a minimal passage with a open cross section of at least 2.5 $cm^2$, advantageously at least 5 $cm^2$, preferably from 5 $cm^2$ to 20 $cm^2$.

The guiding catalytic channels are made at least partly in a temperature ceramic like material, advantageously comprising aluminium, the wall of which being provided with a catalytic coating with a thickness from 50 μm up to 1 mm, preferably from 100 μm to 5000 μm.

The second burning zone C2 comprises at least 20 (such as 50 to 200) distinct and parallel guiding catalytic channels 15.

The second burning zone can also be provided with an air admission system 16, as well as a water vapour admission system 17.

The cerium-carbon containing coating comprises at least Y and Zr, advantageously the weight ratio Y/Zr expressed as oxides present in the catalyst coating is comprised between 1:10 and 10:1, preferably between 2:10 and 10:2. It has been observed that the presence of zirconium was beneficial for ensuring a catalytic efficiency on a long period of time, as well as beneficial for ensuring a more constant and less variable catalytic activity.

The cerium-carbon containing coating comprises some aluminium, preferably in its oxide or hydroxide form and/or in the form of aluminosilicate, whereby the aluminium metal content of the catalyst coating with respect to the total metal weight content of the catalyst coating of metal selected from Al, Ce, Pr, Nd, La and at least Y and/or Zr is comprised between 1 and 10%.

The relative weight of the metals selected from Ce, Pr, La, Nd, Y and Zr, expressed respectively as the following oxides $CeO_2$, $Pr_6O_{11}$, $La_2O_3$, $Nd_2O_3$, $Y_2O_3$. and $ZrO_2$ of the cerium-carbon containing coating of said guiding catalytic channels with respect to total weight of the said metals expressed as oxides are:

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17%

It was observed that substantially all the hydrogen species were reacted with oxygen into water/water vapour in the catalytic guiding channels 15. When leaving the guiding catalytic channels 15, the pressure of the flue gases was a little reduced with respect to the pressure inside of the channels 15. The pressure thereafter increased due to a phase expansion of the steam (dry superheated steam) in the collecting system D, whereby enabling a first heat/energy recovery). Then the steam containing flue gas passes within the condenser/heat exchange E for a second heat/energy recovery, meaning a drop of pressure.

The (wet) flue gases enter then into the heat exchanger E for recovering heat from the flue gases. The heat recovery was quite effective, as large amount of water could be condensed, said water being acid. The temperature of the flue gases was below 100° C., such as from 70 to 90° C. The so collected condensed water was then further treated for neutralising acid components and for removing solid particles (dust, fly ash, etc.), before being naturally treated in lagoons. The flue gases exhausted from the heat exchanger E are then treated with an absorbent, such as a dry absorbent like calcium hydroxide or calcium hydroxide based absorbent, if required.

After said latest treatment substantially all noxious compounds of the flue gases were removed.

It was observed that some catalyst of the second burning zone C2 formed a deposit on the surface of the flue gases collecting system D as well within the outlet of the chamber, whereby ensuring a further catalytic treatment of the flue gases into the collecting system.

It was also observed that the flue gases exhausted from the catalytic guiding channels 15 were equivalent to a superheated—dry—steam, said superheated steam being submitted to some expansion (zone 25) in the gases collecting system adjacent to the outlet 15B of the second burning zone (i.e. with the gas outlet of the chamber). Said superheated dry steam expansion and the condenser E ensuring a high velocity outflow of the hot flue gases, whereby enabling to reduce the velocity of the air necessary for ensuring a fluidisation of the combustible material.

If necessary, some extra liquid or gaseous fuel can be admitted within the first burning zone C1 through an injector 121.

For ensuring some rejuvenation of the catalyst of the second burning zone, methane (or possibly some fuel) and water can be injected within the first burning zone, advantageously without the presence of some waste material or other combustible material.

Figure 6:
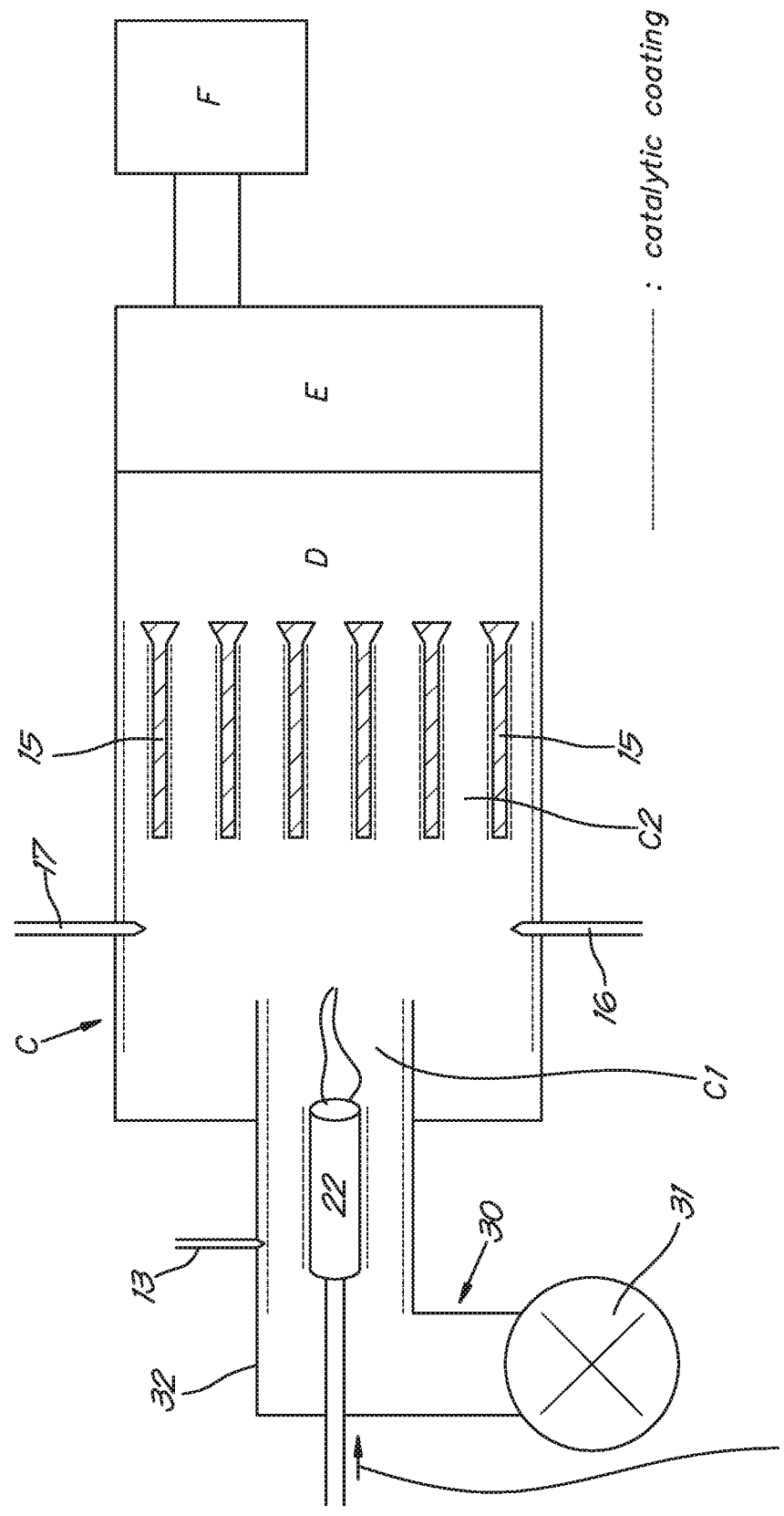
FIG. 6 is another schematic view of a burning installation of the invention.

FIG. 6 is an installation similar to that of FIG. 5, except the installation is provided with an injector 22 for injecting particle combustible material and/or liquid fuel and/or gaseous fuel within the first burning zone C1 (said injection being operated substantially without the presence of oxygen/air), and a system 30 for injecting air in the combustion chamber C. Said system is for example a fan 31 conducting air within a tube 32 extending within the combustion chamber, whereby the injector 22 is located within the said tube 32. The inner wall of the tube is provided with a catalytic coating. The channel system C2 is similar to that of FIG. 5. The installation of FIG. 6 can also be provided with a water vapour injector 16.

The catalytic coating of the tube is advantageously of the same type as the catalytic coating within the second burning zone, as well as on the wall of the flue gases collecting system D.

The combustion chamber, especially the second burning zone is provided with a catalyst or a catalyst precursor.

The catalytic guiding channels C2 or the tube 32 are for example a support (alumino silicate, alumina silico phosphate, ceramic, etc.) provided with a catalyst coating or a precursor coating suitable for generating a catalyst coating.

The precursor used was a mix of nano scale particles possibly dispersed in a wax or liquid, the composition of said mix being:

1. nano carbon primary particles with a size of less than 10 nm (possibly agglomerated into a structure with a size of less than 500 nm. Said nano carbon primary particles are present in the precursor mix at a rate of 10 to 50% by weight, advantageously from 15 to 30% by weight, preferably about 20% by weight. Instead of using carbon nano particles as such, a wax possibly with carbon nano particles can be used. The carbon particles are preferably comprising some particles forming a two-dimensional graphene and/or graphane structure, most particularly a mono layered two dimensional graphene and/or graphane structure.

2. a mix of metal oxide particles, especially of nanoparticles (particles with a size of less than 200 nm, preferably at least partly less than 50 nm. Said mix of metal particles comprises advantageously with respect to the total mix of said metal oxide particles (as weight %):

Ce (as $CeO_2$): 25 to 50%, preferably from 35 to 45%,
Pr (as $Pr_6O_{11}$): 2 to 10%, preferably from 2.5 to 6%
La (as $La_2O_3$): 15 to 37%, preferably from 20 to 32%
Nd (as $Nd_2O_3$): 4 to 15%, preferably from 5 to 13%
Y (as $Y_2O_3$): 5 to 15%, preferably from 8 to 12%
Zr (as $ZrO_2$): 5 to 25%, preferably from 10 to 17%
Al (as $Al_2O_3$): 0 to 10%, preferably from 1% to 5%
Si (as $SiO_2$): 0 to 10%, preferably from 0.5 to 5% (Said silicon can be in the form of liquid or soluble tetra ethoxy silane, in a solvent system, such as methanol, ethanol, etc.)

The mix of nano oxide particles is advantageously a mix of nano oxide particles with a weight average size of more than 100 nm and of nano oxide particles with a weight average size of less than 70 nm, the weight ratio nano oxide particle with a weight average size greater than 100 nm/nano particles with a weight average size lower than 70 nm being comprised between 5:1 and 1:5, advantageously between 4:1 and 2:1.

3. possibly a wax or liquid system, for enabling some adhesion of the particles on the surface to be coated, said wax or liquid being preferably molecules comprising carbon and hydrogen, as well as preferably oxygen atoms.

the weight ratio wax/mix of metal oxide particles is advantageously greater than 2, such as comprised from 2.5 up to 6.

The precursor was used for coating (for example by brushing, blowing, spraying, etc.) wall of the combustion chamber. The combustion chamber is then burning fuel with air for 30 minutes. After said burning step, the excess of catalyst was removed.

The catalyst coating had a thickness of less than about 70 nm, with metal particles homogeneously dispersed.

The combustion chamber will moreover have the following advantages:

high thermal stability of the catalyst high ionic conductivity of the coating possibility to burn at least partly the carbon and the hydrogen from the fuel separately, namely a large portion of the fuel carbon in the volume of the chamber (comprising the plasma zone adjacent to the catalyst coating(s), i.e. in a $N_2$ enriched environment with respect to air), and a large portion of the fuel hydrogen on or in the catalyst coating(s) (i.e. namely in a $O_2$ rich environment or in a reduced $N_2$ environment with respect to air)

High oxygen storage capacity, with high uptake and release oxygen rate

High hydrogen storage capacity

Possible down sizing of the filter or gas cleaning unit, due to less small particle emissions, as well as excellent working of the condenser/cooler.

Possibility to use a filter with large pore size

Possibility to reduce pressure drop in the exhaust, at the level of the filter, quicker activation of the three way catalyst stable working of the catalyst during time, whereby less catalyst rejuvenation is needed possible working of the engine with lambda value higher than 1.3, such as higher than 1.4, such as from 1.4 to 1.3, such as from 1.5 to 2.1.

improved post treatment less NOx low HC content in the exhaust gases less carbon particles exhaust (especially substantially no small sized carbon particles exhaust, such as substantially no carbon particle with a size of less than 5 μm)

no soot formation in the combustion chamber no soot deposit in the exhaust pipe high water vapour exhaust.

Higher global amount of free electrons in the combustion chamber.

The invention claimed is:

1. A catalyst precursor for a burning catalyst for catalytic burning a carbon and hydrogen containing combustible in an oxygen containing gaseous medium in a burning zone of a burning chamber with at least one burning catalytic wall contacting the burning zone, said burning catalyst being a cerium oxide-carbon containing catalyst coating on the said burning catalytic wall, whereby said cerium oxide-carbon containing catalyst coating further comprises at least oxides of the followings elements Pr, Nd, La, Y and Zr, whereby said cerium oxide-carbon containing catalyst coating is adapted for controlling the formation of H+ species at least on the burning catalytic wall of the burning chamber, while controlling the hydrogen branching reactions by catalysing use of oxygen atoms from at least one metal oxide with the metal selected from the group consisting of Ce, Pr, Nd, La, Y and Zr for reacting with hydrogen $H_2$ for the formation of $H_2O$ on the burning catalytic wall of the burning chamber, whereby the Z and Y weight metal content expressed as oxide in the total metal weight content of metal elements selected from Ce, Pr, Nd, La, Y and Zr expressed as oxide is at least 10% by weight, in which the catalyst precursor is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of the cerium-carbon containing catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

2. The catalyst precursor of claim 1, in which the catalyst precursor is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of the cerium-carbon containing catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:

Ce, as $CeO_2$: from 35 to 45%,
Pr, as $Pr_6O_{11}$: from 2.5 to 6%
La, as $La_2O_3$: from 20 to 32%
Nd, as $Nd_2O_3$: from 5 to 13%
Y, as $Y_2O_3$: from 8 to 12%
Zr, as $ZrO_2$: from 10 to 17%.

3. The catalyst precursor of claim 1, which further comprises an aluminium containing component selected from the group consisting of aluminium oxide, aluminosilicate, alumino phospho silicate, and mixtures thereof.

4. The catalyst precursor of claim 1, which is in the form of particles with a size of less than 10 μm.

5. The catalyst precursor of claim 1, which is in the form of particles with a size in the nano range.

6. An at least partly stratified charge combustion engine, in which the combustion of a hydrocarbon containing fuel generating a flame emitting photon is operated in at least one burning zone of a burning chamber with at least one burning catalytic wall contacting said at least one burning zone, whereby said at least one burning catalytic wall is provided with a cerium oxide-carbon containing burning catalyst coating, whereby said cerium oxide-carbon containing burning catalyst coating further comprises at least oxides of the followings elements Pr, Nd, La, Y and Zr, whereby said cerium oxide-carbon containing burning catalyst coating is adapted for controlling the formation of H+ species at least on the at least one burning catalytic wall of the burning chamber, while controlling the hydrogen branching reactions by catalysing use of oxygen atoms from at least one metal oxide with the metal selected from the group consisting of Ce, Pr, Nd, La, Y and Zr for reacting with hydrogen $H_2$ for the formation of $H_2O$ on the at least one burning catalytic wall of the burning chamber, whereby the Z and Y weight metal content expressed as oxide in the total metal weight content of metal elements selected from Ce, Pr, Nd, La, Y and Zr expressed as oxide is at least 10% by weight, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

7. The engine of claim 6, in which the cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of the cerium-carbon containing catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:

Ce, as $CeO_2$: from 35 to 45%,
Pr, as $Pr_6O_{11}$: from 2.5 to 6%
La, as $La_2O_3$: from 20 to 32%
Nd, as $Nd_2O_3$: from 5 to 13%
Y, as $Y_2O_3$: from 8 to 12%
Zr, as $ZrO_2$: from 10 to 17%.

8. The engine of claim 6, in which the cerium oxide-carbon containing burning catalyst coating is selected among the group consisting of cerium oxide-carbon containing burning catalyst coating adapted for capturing photons emitted by the flame with wavelength from 6500 to 7500 Å, cerium oxide-carbon containing burning catalyst coating adapted for capturing 5 to 25% of the photons with wavelength from 6500 to 7500 Å emitted by the flame having a temperature higher than 800° C., cerium oxide-carbon containing burning catalyst coating adapted for ensuring a photon amplified spectrum emission radiation at least at a temperature comprised between 500° C. and 800° C., and combinations thereof.

9. The engine of claim 6, which comprises at least four successive steps, namely an intake step for charging the burning chamber with a gaseous medium comprising at least oxygen and nitrogen, a compression step in which said at least oxygen and nitrogen is compressed, a combustion step in the combustion chamber, and an exhaust step for the exhaust of gases present in the combustion chamber, whereby at least during one step selected from the group of the intake step and compression step, the said cerium oxide-carbon containing burning catalyst coating is adapted for uptake of oxygen atoms of the gaseous medium at least at a temperature comprised between 100 and 400° C.

10. The engine of claim 9, in which the cerium oxide-carbon containing burning catalyst coating is adapted for uptake of hydrogen atoms at least at temperature comprised between 300 and 700° C.

11. The engine of claim 9, in which the cerium oxide-carbon containing burning catalyst coating acts as catalyst for the reaction of oxygen stored in the cerium oxide-carbon containing burning catalyst coating with hydrogen components selected from $H_2$ and hydrogen species for the formation of water at least at temperature above 500° C. and at pressure higher than 30 $10^5$ Pa.

12. The engine of claim 6, which comprises at least four successive steps, namely an intake step for charging the burning chamber with a gaseous medium comprising at least oxygen and nitrogen, a compression step in which said at least oxygen and nitrogen is compressed, a combustion step of a hydrocarbon containing fuel in the combustion chamber, and an exhaust step for the exhaust of gases present in the combustion chamber, whereby at least during one step selected from the group of the intake step and compression step, the said cerium oxide-carbon containing burning catalyst coating is adapted for uptake of oxygen atoms of the gaseous medium at a temperature comprised between 100 and 400° C., and in which the hydrocarbon containing fuel is converted into carbon containing species or molecules and into hydrogen and hydrogen species, at least at temperature above 500° C. and pressure above 20 $10^5$ Pa.

13. The engine of claim 12, in which the said cerium oxide-carbon containing burning catalyst coating is adapted for reducing at least by 50 mole % of the hydrogen $H_2$ contacting the said cerium oxide-carbon containing burning catalyst coating into species selected from the group consisting of free H species, free OH species, and mixtures thereof, at temperature above 500° C. and pressure above 20 $10^5$ Pa.

14. The engine of claim 12, which comprises cylinders and at least one moving piston per cylinder, whereby at least one element selected form the group consisting of cylinders and pistons has a face directed towards the burning chamber, whereby said face directed towards the burning chamber is at least partly an alumino containing face provided the said cerium oxide-carbon containing burning catalyst coating.

15. The engine of claim 6, in which at least 50% of the carbon present in the said cerium oxide-carbon containing burning catalyst coating is in the form of units selected from the group consisting of graphene units, graphane units and combinations thereof.

16. The engine of claim 6, in which the said cerium oxide-carbon containing burning catalyst coating is adapted for controlling the formation of carbon particles in the form of porous graphite at least on the burning catalytic wall of the burning chamber.

17. The engine of claim 6, in which the said cerium oxide-carbon containing burning catalyst coating is adapted for emitting in function of the temperature rays with wave lengths in the violet range, rays with wavelengths in the blue range, rays with wave lengths in the green range, rays with wave lengths in the yellow range, as well as rays with wave lengths in the red range.

18. The engine of claim 6, which is an at least partly dual stratified charge combustion engine, having two opposite surfaces in relative movement the one with respect to the other, said two opposite surfaces being provided with the said cerium oxide-carbon containing burning catalyst coating.

19. The engine of claim 6, being an opposed-piston engine comprising at least one cylinder in each of which a first piston with a first cross section with a first diameter is moving along a first axis and a second piston with a second cross section with a second diameter equal or different from the first diameter is moving along a second axis parallel to or corresponding to the first axis, whereby said first piston and said second piston are reciprocating along to each other between a first position in which the said first and second pistons are close the one to the other in the cylinder considered, whereby defining in said cylinder considered a small volume between the said first and second pistons, and a second position in which the first and second pistons are away the one with respect to the other so as to define therebetween a second volume in the cylinder considered which is greater than the first volume, whereby each cylinder is provided with a catalytic open element located within the small volume of the cylinder considered, said open element separating the said first volume into a first zone directed towards the first piston and a second zone directed towards the second piston, while defining one or more open channels extending between the first zone and the second zone, said one or more passages defining an open cross section defining an open surface within a plane perpendicular to the first axis and second axis which is comprised between 0.2 and 0.8 times the average cross section of the first and second piston, whereby at least the one or more channels of the catalytic open element defines the at least one burning catalytic wall provided with the said cerium oxide carbon containing burning catalyst coating.

20. The engine of claim 19, in which the catalytic open element has a plurality of distinct channels with a minimum open cross section of at least 0.5 $cm^2$, and in which the catalytic open element is made at least partly in a temperature ceramic like material.

21. The engine of claim 19, which comprises a plurality of cylinders and a central axis provided with a first wobble plate and a second wobble plate, a first series of pistons being turned to a first wobble plate and connected to said first wobble plate by means of a first series of rods, while a second series of pistons are turned to the second wobble plate and are connected to said second wobble plate by means of a second series of rods.

22. The engine of claim 6, comprising adjacent to said at least one burning catalytic wall, one injector selected among the group consisting of injectors for the admission of a combustible material, injectors for the admission of water vapour, and combinations thereof.

23. A burning catalytic wall comprising a support comprising a cerium oxide-carbon containing burning catalyst coating, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:

Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

24. A regeneration support for regeneration of a burning catalytic wall comprising a catalytic support comprising a cerium oxide-carbon containing burning catalyst coating, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%
in which said regeneration support comprises a top layer with metals selected from Ce, Pr, La, Nd, Y and Zr, whereby the said metals expressed as oxide $CeO_2$, $Pr_6O_{11}$, $La_2O_3$, $Nd_2O_3$, $Y_2O_3$, and $ZrO_2$ with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

25. An at least partly stratified combustion chamber comprising at least two successive distinct burning zones, and a gas outlet, for burning a at least carbon containing combustible material in presence of an oxygen containing gaseous medium selected from air and oxygen enriched air, whereby said combustion chamber comprises a first burning zone provided with at least one inlet for the at least carbon containing combustible material to be burnt into a flue gaseous medium comprising some solid particles, and with at least one inlet for the admission of the oxygen containing gaseous medium, whereby said first burning zone is extended at least with a collecting catalytic channel system for collecting at least partly the flue gaseous medium issued from the first burning zone, whereby said collecting catalytic channel system is provided with a series of guiding catalytic channels extending each between a first open end directed towards the first burning zone, said first open end having an open surface, and a second open end directed towards the gas outlet of the combustion chamber, said guiding catalytic channels being provided each with a means for forming at least one restricted passage adjacent to its second open end, said restricted passage of each guiding catalytic channel in consideration having an open surface which is comprised between 25% and 90% of the open surface of the guiding catalytic channel in consideration adjacent to its first open end,
whereby each guiding catalytic channel of said series of guiding catalytic channels is provided with a cerium oxide-carbon containing burning catalyst coating which further comprises at least oxides of the followings elements Pr, Nd, La, Y and Zr, whereby said cerium oxide-carbon containing burning catalyst coating is adapted for controlling the formation of H+ species at least on the at least one burning catalytic wall of the burning chamber, while controlling the hydrogen branching reactions by catalysing use of oxygen atoms from at least one metal oxide with the metal selected from the group consisting of Ce, Pr, Nd, La, Y and Zr for reacting with hydrogen $H_2$ for the formation of $H_2O$ on the at least one burning catalytic wall of the burning chamber, whereby the Z and Y weight metal content expressed as oxide in the total metal weight content of metal elements selected from Ce, Pr, Nd, La, Y and Zr expressed as oxide is at least 10% by weight,
in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

26. The combustion chamber of claim 24, in which the cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of the cerium-carbon containing catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: from 35 to 45%,
Pr, as $Pr_6O_{11}$: from 2.5 to 6%
La, as $La_2O_3$: from 20 to 32%
Nd, as $Nd_2O_3$: from 5 to 13%
Y, as $Y_2O_3$: from 8 to 12%
Zr, as $ZrO_2$: from 10 to 17%.

27. The combustion chamber of claim 24, in which the cerium oxide-carbon containing burning catalyst coating is selected among the group consisting of cerium oxide-carbon containing burning catalyst coating adapted for capturing photons emitted by the flame with wavelength from 6500 to 7500 Å, cerium oxide-carbon containing burning catalyst coating adapted for capturing 5 to 25% of the photons with wavelength from 6500 to 7500 Å emitted by the flame having a temperature higher than 800° C., cerium oxide-carbon containing burning catalyst coating adapted for ensuring a photon amplified spectrum emission radiation at least at a temperature comprised between 500° C. and 800° C., and combinations thereof.

28. The combustion chamber of claim 25, in which the guiding catalytic channels have each a minimal open cross section of at least 2.5 $cm^2$.

29. The combustion chamber of claim 28, in which the guiding catalytic channels have each a minimal open cross section from 5 $cm^2$ to 20 $cm^2$.

30. The combustion chamber of claim 25, in which the guiding catalytic channels are made at least partly in a temperature resistant ceramic like material having a wall which is provided with the cerium oxide-carbon containing burning catalyst coating having a thickness from 50 µm up to 10 mm.

31. The combustion chamber of claim 25, which is associated with a system adapted for the admission of air or oxygen enriched air within the first burning zone and/or in the second burning zone.

32. The combustion chamber of claim 25, which is associated to at least one injector for the admission of water vapour within the first burning zone.

33. A combustion chamber which comprises at least one element selected from the group consisting of a fuel injector, a water vapour injector, a spark plug, a sensor comprising at least a core provided with a cerium oxide-carbon containing burning coating, in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

34. The chamber of claim 32, in which the cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of the cerium-carbon containing catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: from 35 to 45%,
Pr, as $Pr_6O_{11}$: from 2.5 to 6%
La, as $La_2O_3$: from 20 to 32%
Nd, as $Nd_2O_3$: from 5 to 13%
Y, as $Y_2O_3$: from 8 to 12%
Zr, as $ZrO_2$: from 10 to 17%.

35. A process of burning a combustible material selected from the group consisting of coal, biomass combustible, fuel, combustible waste material and mixtures thereof in presence of air or oxygen enriched air within a combustion chamber comprising at least two successive distinct burning zones, and a gas outlet, for burning a at least carbon containing combustible material in presence of an oxygen containing gaseous medium selected from air and oxygen enriched air, whereby said combustion chamber comprises a first burning zone provided with at least one inlet for the at least carbon containing combustible material to be burnt into a flue gaseous medium comprising some solid particles, and with at least one inlet for the admission of the oxygen containing gaseous medium, whereby said first burning zone is extended at least with a collecting catalytic channel system for collecting at least partly the flue gaseous medium issued from the first burning zone, whereby said collecting catalytic channel system is provided with a series of guiding catalytic channels extending each between a first open end directed towards the first burning zone, said first open end having an open surface, and a second open end directed towards the gas outlet of the combustion chamber, said guiding catalytic channels being provided each with a means for forming at least one restricted passage adjacent to its second open end, said restricted passage of each guiding catalytic channel in consideration having an open surface which is comprised between 25% and 90% of the open surface of the guiding catalytic channel in consideration adjacent to its first open end,
whereby each guiding catalytic channel of said series of guiding catalytic channels is provided with a cerium oxide-carbon containing burning catalyst coating which further comprises at least oxides of the followings elements Pr, Nd, La, Y and Zr, whereby said cerium oxide-carbon containing burning catalyst coating is adapted for controlling the formation of H+ species at least on the at least one burning catalytic wall of the burning chamber, while controlling the hydrogen branching reactions by catalysing use of oxygen atoms from at least one metal oxide with the metal selected from the group consisting of Ce, Pr, Nd, La, Y and Zr for reacting with hydrogen $H_2$ for the formation of $H_2O$ on the at least one burning catalytic wall of the burning chamber, whereby the Z and Y weight metal content expressed as oxide in the total metal weight content of metal elements selected from Ce, Pr, Nd, La, Y and Zr expressed as oxide is at least 10% by weight,
in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

36. A process of producing mechanical energy by burning a hydrocarbon containing fuel into an air containing gaseous medium in a least partly stratified charge combustion engine, in which the combustion of a hydrocarbon containing fuel generating a flame emitting photon is operated in at least one burning zone of a burning chamber with at least one burning catalytic wall contacting said at least one burning zone, whereby said at least one burning catalytic wall is provided with a cerium oxide-carbon containing burning catalyst coating, whereby said cerium oxide-carbon containing burning catalyst coating further comprises at least oxides of the followings elements Pr, Nd, La, Y and Zr, whereby said cerium oxide-carbon containing burning catalyst coating is adapted for controlling the formation of H+ species at least on the at least one burning catalytic wall of the burning chamber, while controlling the hydrogen branching reactions by catalysing use of oxygen atoms from at least one metal oxide with the metal selected from the group consisting of Ce, Pr, Nd, La, Y and Zr for reacting with hydrogen $H_2$ for the formation of $H_2O$ on the at least one burning catalytic wall of the burning chamber, whereby the Z and Y weight metal content expressed as oxide in the total metal weight content of metal elements selected from Ce, Pr, Nd, La, Y and Zr expressed as oxide is at least 10% by weight,
in which said cerium oxide-carbon containing burning catalyst coating is such that the relative weight of the metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ of said cerium oxide-carbon containing burning catalyst coating with respect to total weight of the said metals selected from Ce, Pr, La, Nd, Y and Zr, expressed as oxide $CeO_2$, $Pr_6O_{11}$, $La_2O_3$, $Nd_2O_3$, $Y_2O_3$, and $ZrO_2$ are:
Ce, as $CeO_2$: 25 to 50%,
Pr, as $Pr_6O_{11}$: 2 to 10%,
La, as $La_2O_3$: 15 to 37%,
Nd, as $Nd_2O_3$: 4 to 15%,
Y, as $Y_2O_3$: 5 to 15%,
Zr, as $ZrO_2$: 5 to 25%.

* * * * *